(12) United States Patent
Brooks et al.

(10) Patent No.: US 10,178,062 B2
(45) Date of Patent: Jan. 8, 2019

(54) TECHNIQUES FOR EPHEMERAL MESSAGING WITH REMOTE EPHEMERAL MODE CONFIGURATION

(71) Applicant: Facebook, Inc., Menlo Park, CA (US)

(72) Inventors: Evan Gabriel Brooks, San Francisco, CA (US); Alexander Salem Franklin, Cupertino, CA (US); Matthew Steiner, Los Altos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 188 days.

(21) Appl. No.: 15/175,104

(22) Filed: Jun. 7, 2016

(65) Prior Publication Data

US 2017/0353416 A1  Dec. 7, 2017

(51) Int. Cl.
*H04L 12/58* (2006.01)
*H04L 29/06* (2006.01)
*H04L 29/08* (2006.01)

(52) U.S. Cl.
CPC ............. *H04L 51/16* (2013.01); *H04L 51/04* (2013.01); *H04L 67/025* (2013.01); *H04L 67/04* (2013.01); *H04L 67/10* (2013.01); *H04L 67/125* (2013.01); *H04L 67/42* (2013.01); *H04L 69/28* (2013.01)

(58) Field of Classification Search
CPC .......... H04L 51/16; H04L 51/04; H04L 69/28
USPC ......................................................... 709/206
See application file for complete search history.

(56) References Cited

U.S. PATENT DOCUMENTS

| | | | |
|---|---|---|---|
| 9,294,425 B1 * | 3/2016 | Son | H04L 51/18 |
| 2008/0059587 A1 * | 3/2008 | Burtner | H04L 51/36 709/206 |
| 2009/0265255 A1 * | 10/2009 | Jackson | G06F 17/30973 705/26.1 |
| 2016/0359773 A1 * | 12/2016 | Shi | H04L 51/04 |
| 2016/0359779 A1 * | 12/2016 | Shi | H04L 51/046 |

* cited by examiner

*Primary Examiner* — Joseph L Greene

(57) ABSTRACT

Techniques for ephemeral messaging with remote ephemeral mode configuration are described. In one embodiment, an apparatus may comprise a messaging component operative to receive a messaging update at a messaging client on the client device from a messaging system; determine a message thread associated with the messaging update; and determine that the messaging update indicates a transition to an ephemeral mode for the message thread; and a user interface component operative to configure a user interface for the message thread to an ephemeral mode interface based on the transition to the ephemeral mode for the message thread. Other embodiments are described and claimed.

18 Claims, 18 Drawing Sheets

US 10,178,062 B2

TECHNIQUES FOR EPHEMERAL MESSAGING WITH REMOTE EPHEMERAL MODE CONFIGURATION

RELATED APPLICATIONS

This application is related to U.S. patent application Ser. No. 14/621,846, titled "Techniques for a Persistent Queue for Message Syncing," filed on Feb. 13, 2015, which is hereby incorporated by reference in its entirety.

This application is related to U.S. patent application Ser. No. 14/621,851, titled "Techniques for a Sequential Message Reader for Message Syncing," filed on Feb. 13, 2015, which is hereby incorporated by reference in its entirety.

This application is related to a U.S. patent application Ser. No. 14/951,666, titled "Techniques to Remotely Configure Network Settings," filed on Nov. 25, 2015, which is hereby incorporated by reference in its entirety.

This application is related to a U.S. patent application Ser. No. 14/965,623, titled "Techniques for Ephemeral Messaging with Legacy Clients," filed on Dec. 10, 2015, which is hereby incorporated by reference in its entirety.

This application is related to a U.S. patent application Ser. No. 14/965,632, titled "Techniques for Ephemeral Messaging with a Message Queue," filed on Dec. 10, 2015, which is hereby incorporated by reference in its entirety.

BACKGROUND

Internet users may engage in communication with each other, such as through the exchange of messages. Users may compose messages to each other on computing devices and transmit them to each other, such as via an intermediary messaging platform. Users may have accounts registered with the intermediary messaging platform establishing an address at which they may be contacted. The users may compose and submit their messages using these addresses. Users may receive their correspondence at their address by accessing the intermediary messaging platform with their address and a password associated with their account.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for ephemeral messaging with remote ephemeral mode configuration. Some embodiments are particularly directed to techniques for ephemeral messaging with remote ephemeral mode configuration on a thread-specific basis. In one embodiment, for example, an apparatus may comprise a messaging component operative to receive a messaging update at a messaging client on the client device from a messaging system; determine a message thread associated with the messaging update; and determine that the messaging update indicates a transition to an ephemeral mode for the message thread; and a user interface component operative to configure a user interface for the message thread to an ephemeral mode interface based on the transition to the ephemeral mode for the message thread. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
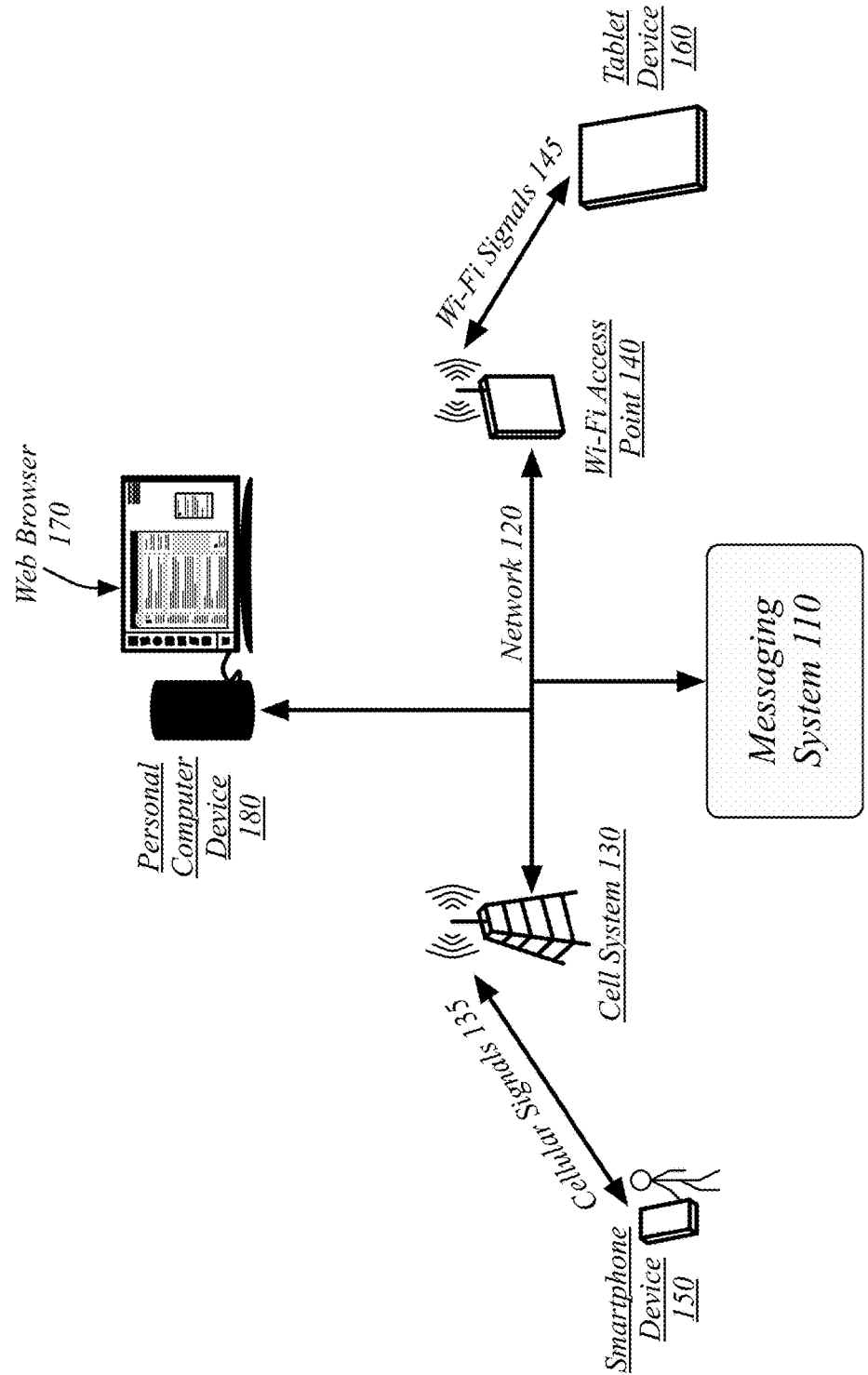
FIG. 1 illustrates an embodiment of a display configuration system.

Users of a messaging system may exchange messages, which may comprise one or both of text and media, such as images, sounds, animated images, and video, without limitation. In some cases, users may desire to have at least some of these messages be automatically removed after a particular duration. This may serve to enhance the privacy of their messaging exchanges. A messaging system may benefit from offering an automatic-delete feature. The messaging system may benefit from offering this feature using techniques that are efficient for a user to control and easy for a user to perceive and understand.

Ephemeral messages may be composed and shared by placing a message thread into an ephemeral mode. The use of an ephemeral mode may be shared across all client devices accessing a message thread. A user on one client device may place a message thread into the ephemeral mode and this transition may be communicated between client devices so as to place the message thread into the ephemeral mode on all the client devices. As such, the use of an ephemeral mode may be a shared experience between all the users involved in a message thread.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a display configuration system 100. In one embodiment, the display configuration system 100 may comprise a computer-implemented system having software applications comprising one or more components. Although the display configuration system 100 shown in FIG. 1 has a limited number of elements in a certain topology, it may be appreciated that the display configuration system 100 may include more or less elements in alternate topologies as desired for a given implementation.

The messaging system 110 may comprise one or more messaging servers operated by a messaging platform as part of the display configuration system 100. A messaging server may comprise an Internet-accessible server, with the network 120 connecting the various devices of the display configuration system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging system 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging system 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging system 110.

A messaging client may be a dedicated messaging client. A dedicated messaging client may be specifically associated with a messaging provider administering the messaging platform including the messaging system 110. A dedicated messaging client may be a general client operative to work with a plurality of different messaging providers including the messaging provider administering the messaging platform including the messaging system 110.

The messaging client may be a component of an application providing additional functionality. For example, a social networking service may provide a social networking application for use on a mobile device for accessing and using the social networking service. The social networking service may include messaging functionality such as may be provided by messaging system 110. It will be appreciated that messaging servers for the messaging system 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging system 110 due to it not maintaining or otherwise not having access to an existing state for the message inbox. The web browser 170 may then retrieve incremental updates for any new changes to the state of the message inbox so long as it maintains a user session with the messaging system 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 110 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 110 may use knowledge generated from interactions in between users. The messaging system 110 may comprise a component of a social-networking system and may use knowledge generated from the broader interactions of the social-networking system. As such, to protect the privacy of the users of the messaging system 110 and the larger social-networking system, messaging system 110 may include an authorization server (or other suitable component(s)) that allows users to opt in to or opt out of having their actions logged by the messaging system 110 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 110 and other elements of a social-networking system through blocking, data hashing, anonymization, or other suitable techniques as appropriate.

Figure 2A:
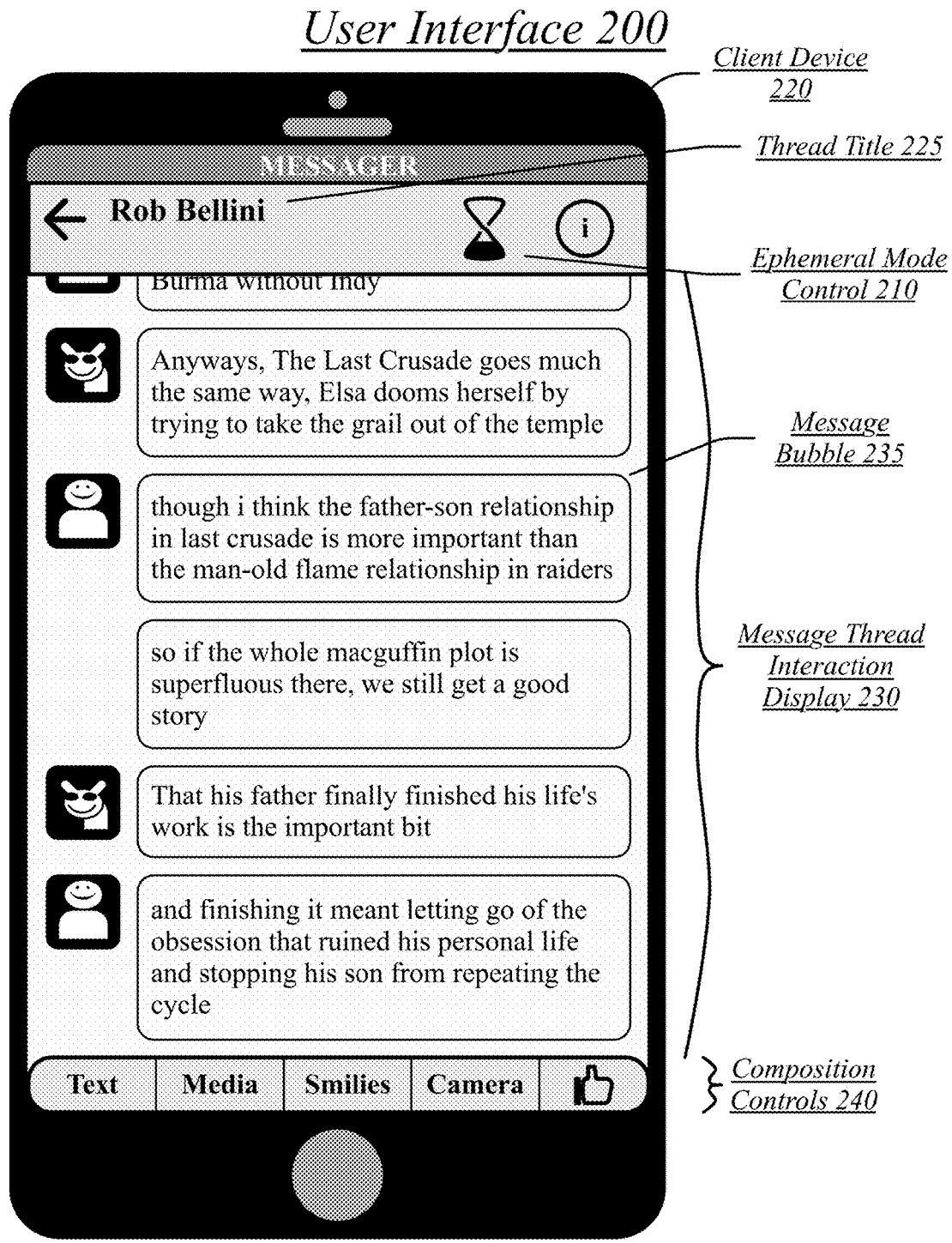
FIG. 2A illustrates an embodiment of a user interface for a message thread.

FIG. 2A illustrates an embodiment of a user interface 200 for a message thread. The user interface 200 may be displayed on a client device 220.

The user interface 200 may comprise a user interface for a one-on-one message thread. At least a portion of the message exchange for the message thread may be displayed in a message thread interaction display 230. A message thread interaction display 230 may comprise a display of one or more messages exchanged by the users of the one-on-one message thread. The features discussed with regards to a on-one message thread may also be applied to group threads.

Each of the one or more messages may be represented by a particular message bubble, such as message bubble 235. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the display configuration system 100.

The user interface 200 may include a thread title 225 listing one or more other users involved in the thread. The thread title 225 may automatically use the name of a user, such as a full name, short name, or other name registered as the name for use with a particular user for messaging and/or social-networking interactions.

The user interface 200 for a message thread may include composition controls 240 that are persistently visible during the display of a message thread. Many, most, or nearly all of the composition controls 240 may empower access to further user interface controls for the performance of various tasks, such as text entry, media selection, emoji selection, camera use, a social approval icon, etc.

The user interface 200 may include an ephemeral mode control 210. The ephemeral mode control 210 may empower the toggling of a message thread between an ephemeral mode and a non-ephemeral mode. The default mode for a message thread may comprise the non-ephemeral mode. The user interface 200 may comprise an embodiment of a message thread in a non-ephemeral mode.

A non-ephemeral mode may comprise a mode in which a messaging system 110 stores all exchanges within the message thread in a history for the message thread, which may be made available to the users within the message thread. This history may empower users to browse the exchanges of a message thread at a later time. However, users may desire for some exchanges within the message thread to be eventually removed from the messaging system 110 and any client devices accessing the messaging system 110. As such, the messaging system 110 may empower client devices to enter an ephemeral mode. In an ephemeral mode, exchanges within the message thread carried out while in the ephemeral mode may eventually be deleted from the messaging system 110 and any messaging clients executing on client devices so as to remove the exchanges from the recorded history of the message thread.

The ephemeral mode control 210 may, when selected by a user while the message thread is in the non-ephemeral mode, transition the message thread to the ephemeral mode. This transition to the ephemeral mode may be distributed to all messaging clients, and therefore client devices, for users in the message thread. Similarly, the ephemeral mode control 210 may, when selected by a user while the message thread is in the ephemeral mode, transition the message thread to the non-ephemeral mode. This transition to the non-ephemeral mode may also be distributed to all messaging clients, and therefore client devices, for users in the message thread. The ephemeral mode control 210 may be selected using, without limitation, touch screen activation of a displayed ephemeral mode symbol corresponding to a display of the ephemeral mode control 210.

The ephemeral mode control 210 may transition to a different symbol or variation on the symbol, such as a new orientation of the symbol, to indicate the current mode. This transition may be animated, such as through one-hundred-eighty-degree rotation of the symbol, to visualize the transition between modes. The symbol may comprise a visualization of an hourglass symbol partially full of sand. An hourglass symbol may be displayed with the appearance of sand at the bottom of the hourglass in the non-ephemeral mode and may be displayed with the appearance of sand at the top of the hourglass in the ephemeral mode, so as to visualize the concept that time may run out for messages sent in the ephemeral mode.

Figure 2B:
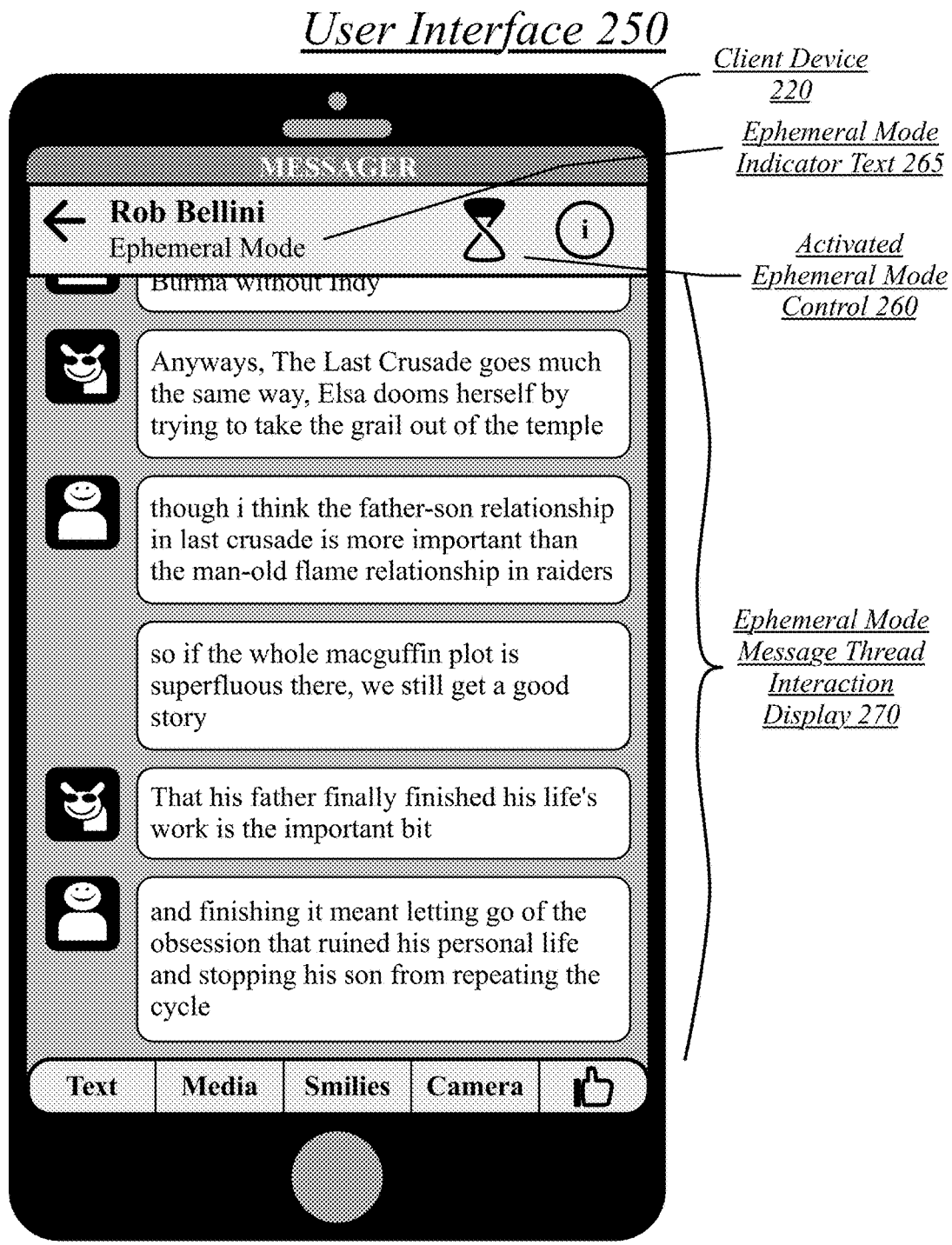
FIG. 2B illustrates an embodiment of a user interface for a message thread in an ephemeral mode.

FIG. 2B illustrates an embodiment of a user interface 250 for a message thread in an ephemeral mode.

In some cases, the user interface 250 for a message thread may be in the ephemeral mode in response to a selection of the ephemeral mode control 210 on the client device 220. In other cases, the user interface for the message thread may be in the ephemeral mode in response to a selection of an ephemeral mode control 210 on another client device also engaged with the same message thread, with the transition to ephemeral mode by the client device 220 remotely configured by the other client device via the messaging system 110. The user interface display for the client device 220 may therefore be remotely configurable by other client devices. Further, as messages sent in the ephemeral mode are marked for network transmission as ephemeral based on a message thread being in the ephemeral mode, the network communication of the client device 220 may also be remotely configurable by other client devices.

When in the ephemeral mode, the user interface 250 for the message thread may include ephemeral mode indicator text 265. The ephemeral mode indicator text 265 may comprise a text segment communicating that the message thread is in the ephemeral mode, such as a text segment reading "Ephemeral Mode," "Secret Mode," "Private Mode," or other relevant text segment. The transition to the ephemeral mode for a message thread may therefore instantiate the display of ephemeral mode indicator text 265.

When in the ephemeral mode, the user interface 250 for the message thread may include an activated ephemeral mode control 260. The activated ephemeral mode control 260 may comprise a particular state of an ephemeral mode control 210 in which an icon, symbol, or other visual display element of the control represents that the message thread is in the ephemeral mode. For instance, an hourglass symbol may be displayed with the appearance of sand at the top of the hourglass in the ephemeral mode, so as to visualize the concept that time is running out for messages sent or received in the ephemeral mode.

The representation of a message thread may be modified while the message thread is in the ephemeral mode as may be represented via an ephemeral mode message thread interaction display 270. The representation of a message thread may include visual elements, such as a visual style for the message thread. The visual style for a message thread may include the colors, patterns, gradients, and other visual elements of a display of a message thread. For instance, the background of the display, the interior of the message bubbles of the display, and the borders of the message bubbles of the display may all have a defined color. The representation of a message thread may include auditory elements, such as an auditory style for the message thread. The auditory style of a message thread may include a sound played when a message is received, a sound played when a message is sent, or any other auditory element of an auditory presentation of a message thread.

For instance, a display of a message thread may use a non-ephemeral user interface color scheme when in the non-ephemeral mode and an ephemeral user interface color scheme when in the ephemeral mode. In some cases, a non-ephemeral user interface color scheme may be a default, general, or universal non-ephemeral user interface color scheme. In other cases, a non-ephemeral user interface color scheme may be a custom non-ephemeral user interface color scheme. A custom non-ephemeral user interface color scheme may be defined for a particular message thread by one or more users of the message thread and distributed by the messaging system 110 to the client devices of the users associated with the message thread.

Where a custom non-ephemeral user interface color scheme is defined for a message thread, a corresponding custom ephemeral user interface color scheme may also be defined for the message thread. In some cases, a custom ephemeral user interface color scheme may be separately defined from a custom non-ephemeral user interface color scheme. In other cases, a custom ephemeral user interface color scheme may be a predefined adjustment of a custom color scheme for the message thread, where a user-defined custom color scheme is used as the non-ephemeral user interface color scheme. A procedural ephemeral-mode adjustment may be defined that is applied to custom color schemes to generate ephemeral-mode color schemes. For instance, one or more colors of the color scheme may be darkened by a defined amount of lightened by a defined amount. One or more colors of the color scheme may be mixed with a defined color, such as making the color scheme closer to blue, purple, or other color associated with an ephemeral mode.

Figure 3A:
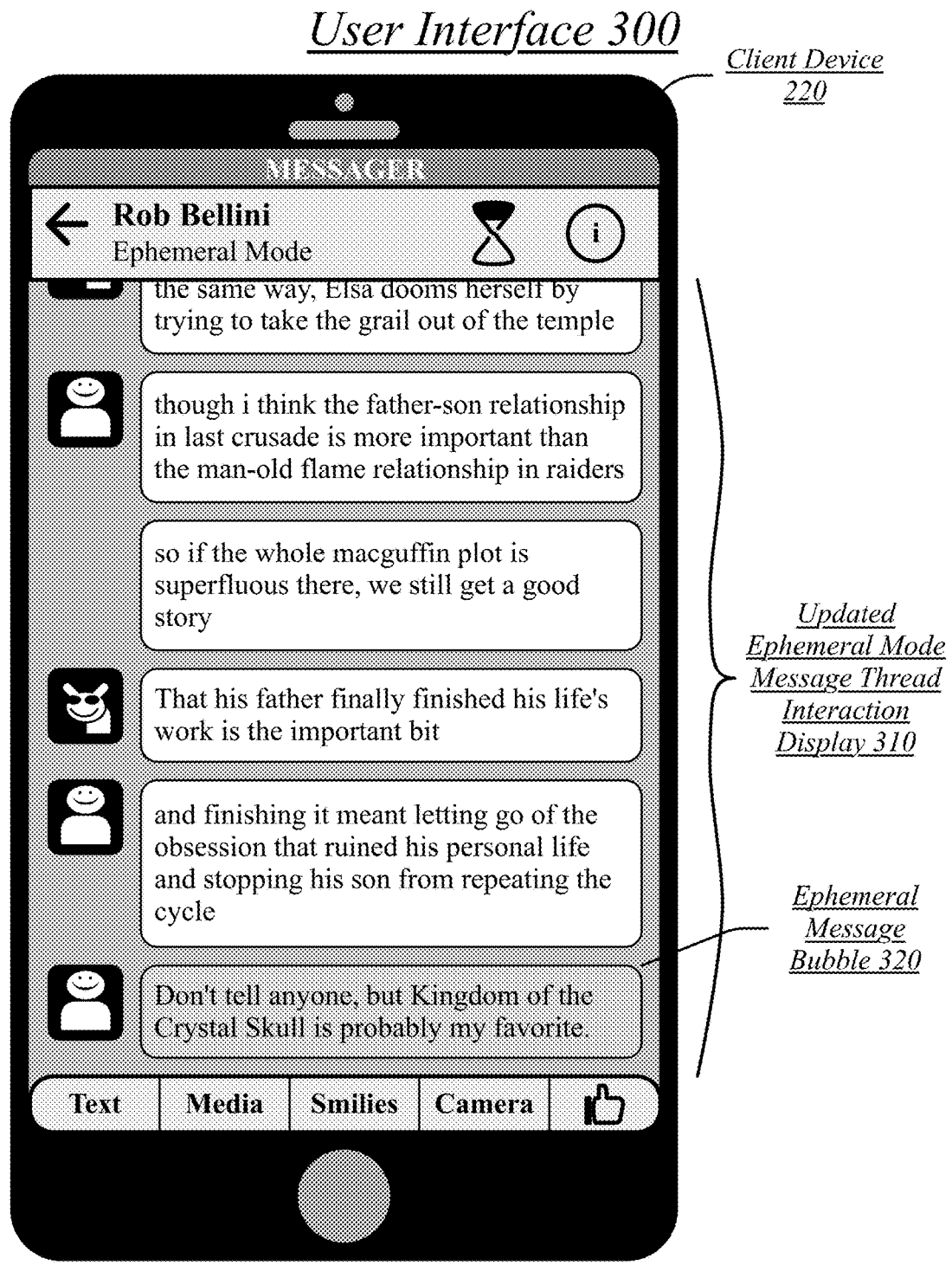
FIG. 3A illustrates an embodiment of a user interface for a message thread with an ephemeral message.

FIG. 3A illustrates an embodiment of a user interface 300 for a message thread with an ephemeral message.

FIG. 3A illustrated an embodiment in which an ephemeral message has been received at the client device 220. The user of another client device may have engaged the ephemeral mode with the shift to the ephemeral mode communicated to the client device 220 by the messaging system 110.

This user, or another user, may then have transmitted a message to the client device 220, also via the messaging system 110. This message may then be displayed in an ephemeral message bubble 320 in an updated ephemeral mode message thread interaction display 310. An ephemeral message bubble 320 may use a distinct color scheme from a non-ephemeral message bubble. An ephemeral message bubble color scheme may be distinct from a non-ephemeral message bubble color scheme whether in the ephemeral mode or non-ephemeral mode. In some embodiments, the non-ephemeral message bubble color scheme may be the same in both the ephemeral mode and non-ephemeral mode. Similarly, the ephemeral message bubble color scheme may be the same in both the ephemeral mode and non-ephemeral mode. Alternatively, there may be distinct ephemeral message bubble color schemes for the ephemeral mode and non-ephemeral mode and, similarly, distinct non-ephemeral message bubble color schemes for the ephemeral mode and non-ephemeral mode, such as by applying a procedural ephemeral-mode adjustment to a non-ephemeral message bubble color scheme and ephemeral message bubble color scheme when transitioning to the ephemeral mode.

Figure 3B:
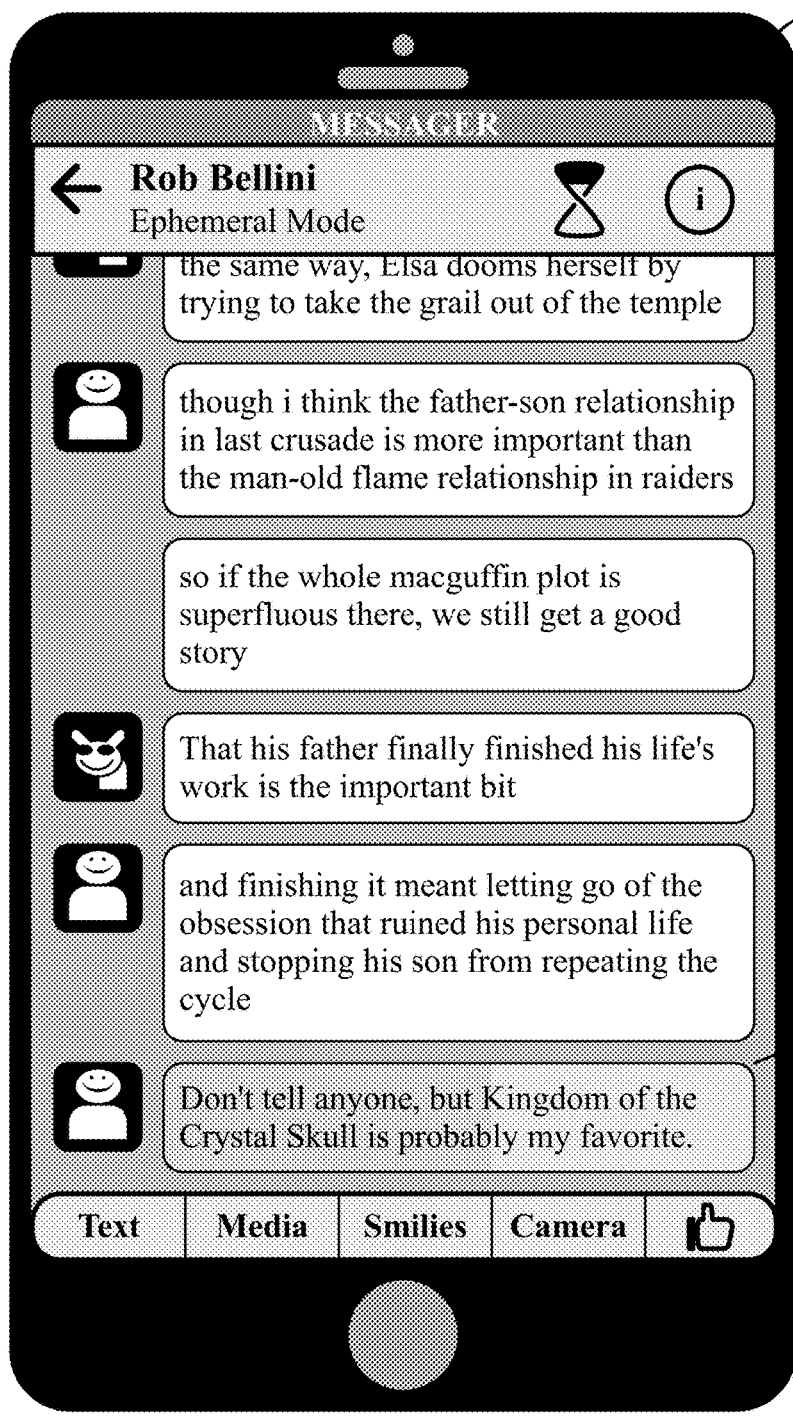
FIG. 3B illustrates an embodiment of a user interface for a message thread with an ephemeral message with a progress bar display.

FIG. 3B illustrates an embodiment of a user interface 325 for a message thread with an ephemeral message with a progress bar display.

An ephemeral message exists for a limited period of time and is then removed from the messaging system 110 and client devices. An ephemeral message may be associated with a timer defining a period of time after which the ephemeral message will be deleted. This timer may be visually illustrated in a user interface 325. A progress bar may be underlaid behind the text or other content (e.g., image, video, controls) of a message bubble, with the progress bar progressing with the running down of the timer. A progressed ephemeral message bubble 330 may indicate the progression of a timer for the removal of an ephemeral message by having the background of the message bubble partially a first color and partially a second color. The first color may be incrementally replaced with the second color as the visualization of the time as a progress bar. The completion of the progress bar may be visualized by the complete removal of the first color with its replacement by the second color, at which time the ephemeral message may be removed from display and from storage on the client device 220, the messaging system 110, and any other client device.

Figure 3C:
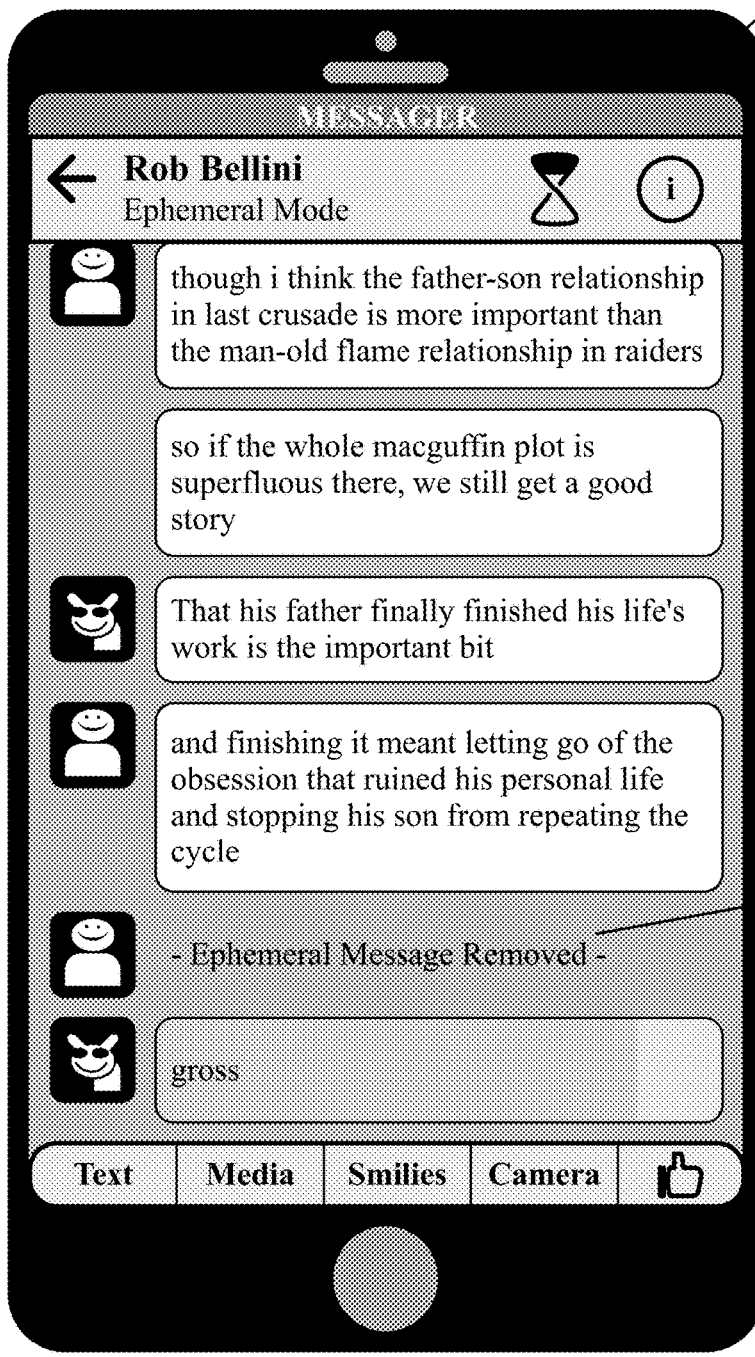
FIG. 3C illustrates an embodiment of a user interface for a message thread with a removed ephemeral message.

FIG. 3C illustrates an embodiment of a user interface 350 for a message thread with a removed ephemeral message.

In some embodiments, when an ephemeral message is removed, it may be simply removed from the message thread display resulting in no indication that it ever existed. However, in other embodiments, a removed ephemeral message may be replaced by a removed message indicator 360 indicating that an ephemeral message was removed. A removed message indicator 360 may serve to remind a user that an ephemeral message has been removed. Further, where a user was not active in a messaging client, or at least not active in the message thread, during the lifetime of the ephemeral message, the removed message indicator 360 may communicate to the user that they missed an ephemeral message. This may empower the user to query the other user(s) in the message thread as to the removed message, which may prompt an explanation, re-sending, or other opportunity to receive the communication embodied in the ephemeral message. A removed message indicator 360 may comprise one or more of text, symbols, icons, or other elements.

Figure 3D:
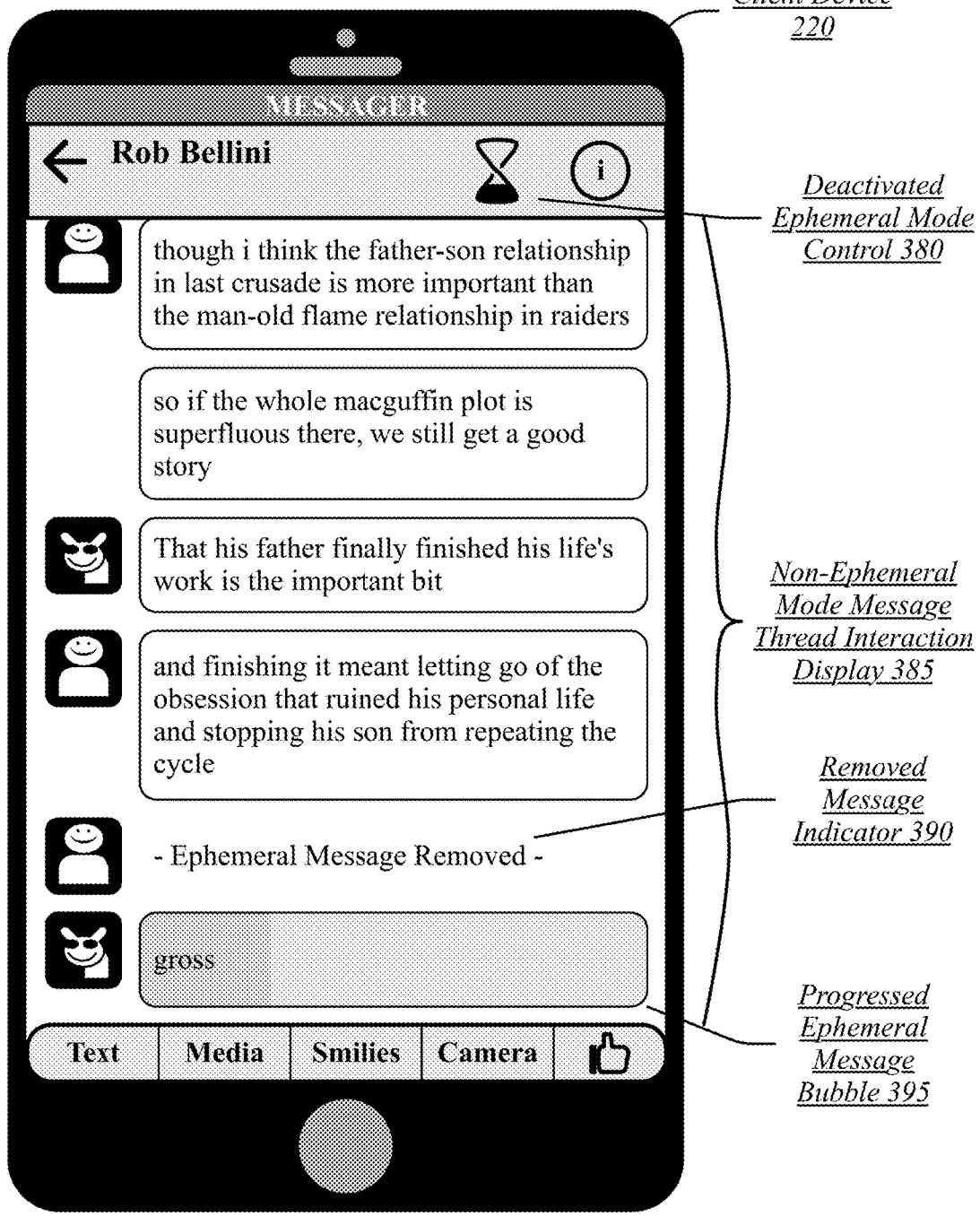
FIG. 3D illustrates an embodiment of a user interface for a message thread in a non-ephemeral mode with remaining ephemeral messages.

FIG. 3D illustrates an embodiment of a user interface 375 for a message thread in a non-ephemeral mode with remaining ephemeral messages.

A message thread may be transitioned back to the non-ephemeral mode. A previously-active ephemeral mode control may be transitioned to a deactivated ephemeral mode control 380 the same as an inactive ephemeral mode control as described with reference to FIG. 2A. The message thread interaction display may be transitioned to a non-ephemeral mode message thread interaction display with the non-ephemeral mode visual style. A removed message indicator 390 may persist from the ephemeral mode or be introduced in the non-ephemeral mode. A progress ephemeral message bubble 395 may be present for any ephemeral message sent or received while in the ephemeral mode. An ephemeral message bubble may be represented as visually distinct from the non-ephemeral message bubbles so as to identify what message are still subject to removal even while in the non-ephemeral mode.

Figure 4:
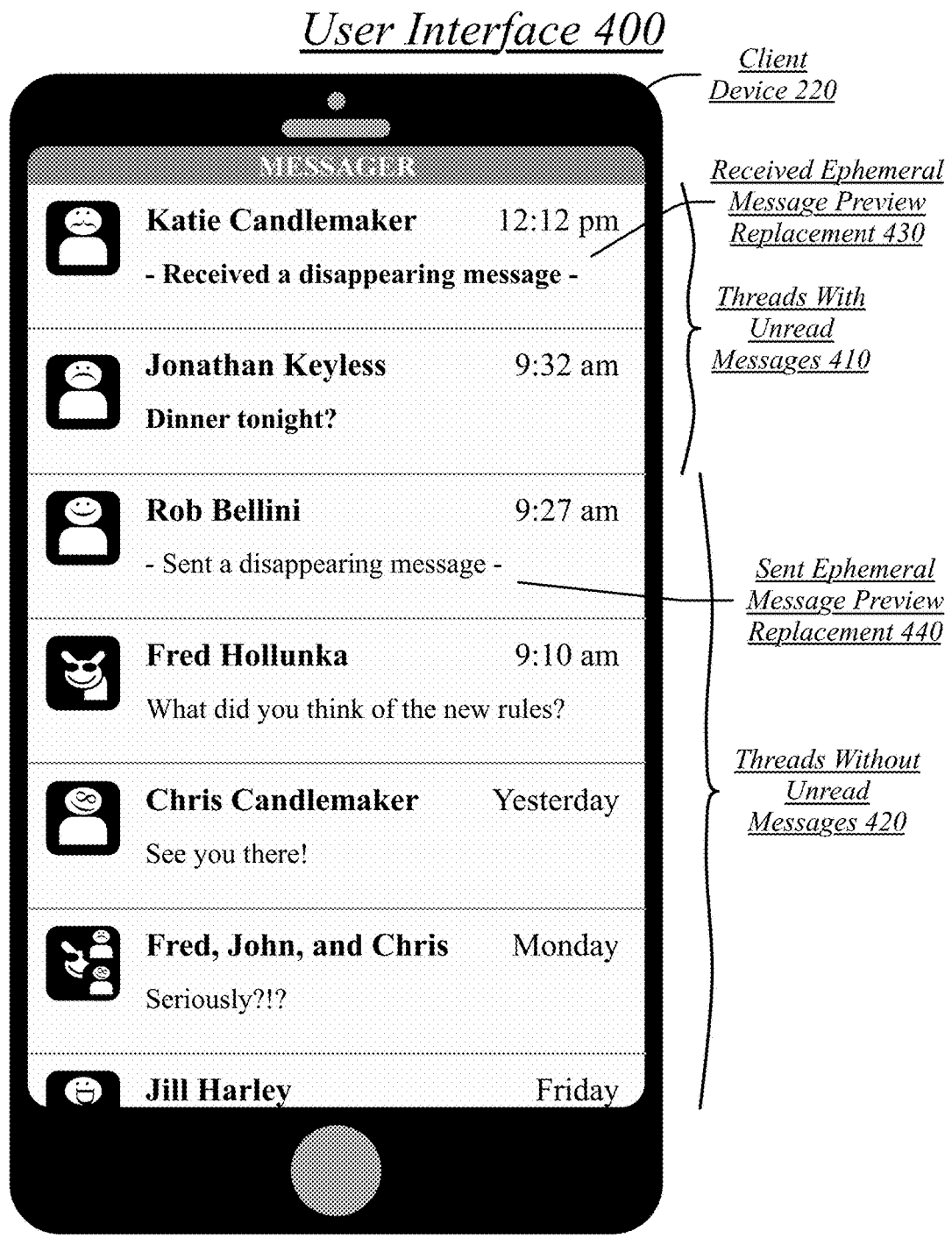
FIG. 4 illustrates an embodiment of a user interface for a message thread selection interface with an ephemeral form message.

FIG. 4 illustrates an embodiment of a user interface 400 for a message thread selection interface with an ephemeral form message.

The user interface 400 may comprise a display of a plurality of threads in an inbox for a user account. A portion of displayed threads may be threads with unread messages 410. A portion of displayed threads may be threads without unread messages 420. The threads with unread messages 410 may be displayed with a higher prominence than the threads without unread messages 420, such as by placing them in a more prominent position. In the illustrated embodiment of FIG. 4, the user interface 400 may be scrolled downwards to reveal more threads.

The threads with unread messages 410 may be displayed in a higher position than the threads without unread messages 420, with additional threads without unread messages 420 being viewable by scrolling downwards. In some cases, sufficient threads with unread messages 410 may exist that the threads without unread messages 420 are only visible by scrolling downwards, with the threads with unread messages 410 being sufficient in number to take up all the available screen space in an initial display of an inbox. Further, the threads with unread messages 410 may be sufficient in number that some portion of the threads with unread messages 410 are only visible after scrolling the display. The display of threads in an inbox may comprise, for each thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox.

In some embodiments, the contents of ephemeral messages may be excluded from an inbox view so as to maintain the privacy associated with the ephemeral mode. Instead, an ephemeral form message may be displayed indicating that the most-recent message in a thread is an ephemeral message. For instance, where a received ephemeral message is the most-recent message in a thread, the preview for the thread may be a received ephemeral message preview replacement 430. Similarly, where a sent ephemeral message is the most-recent message in a thread, the preview for the thread may be a sent ephemeral message preview replacement 440.

Figure 5:
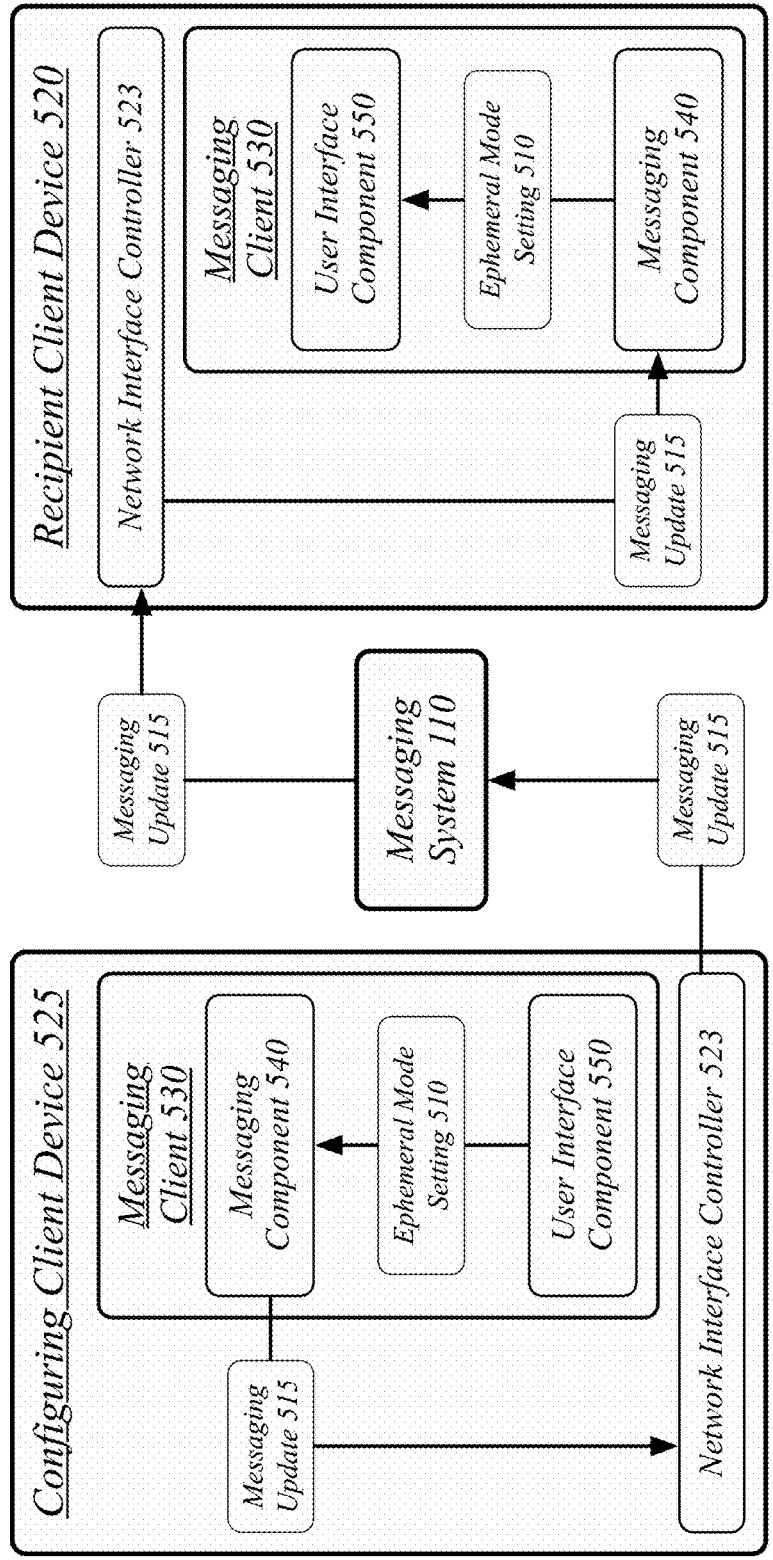
FIG. 5 illustrates an embodiment of a display configuration system transmitting a messaging update indicating a transition to an ephemeral mode for a message thread from a configuring client device to a recipient client device.

FIG. 5 illustrates an embodiment of a display configuration system 100 transmitting a messaging update 515 indicating a transition to an ephemeral mode for a message thread from a configuring client device 525 to a recipient client device 520.

Client devices may communicate via a messaging system 110 through the exchange of messaging updates. Messaging updates may comprise atomic updates to the state of a messaging client. For a particular message thread, related messaging updates may comprise atomic updates to the state of the message thread. A messaging update may comprise the addition of a message to a message thread, the removal of a message from a message thread, a transition in or out of the ephemeral mode for a message thread, or other updates to the state of a messaging client.

A client device may communicate with other devices using wireless transmissions to exchange network traffic. Exchanging network traffic, such as may be included in the exchange of messaging interactions, may comprise transmitting and receiving network traffic via a network interface controller 523 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 523 may be used for the network activities of the embodiments described herein, including the interoperation of the messaging clients and messaging system 110 through network communication. For example, the messaging client transmitting or receiving a messaging update to or from a messaging system 110 may be interpreted as using the network interface controller 523 for network access to a communications network for the transmission or reception of information.

A messaging client 530 may comprise a user interface component 550. The user interface component 550 may be generally arranged to provide interfaces to the functionality of the messaging client 530. For instance, the user interface component 550 may provide interfaces to message viewing, message composition, message sending, and other messaging functions. In general, the user interface component 550 may provide interfaces for any functionality of the messaging client.

The messaging client may comprise a messaging component 540. The messaging component 540 may be generally arranged to provide messaging services to a user of a client device. Messaging services may comprise the reception of messages, the sending of messages, the maintenance of a history of messages exchanged, and other messaging-related activities. User of the messaging client 530 may be empowered to engage in messaging conversations with a plurality of other users in private user-to-user conversations, in private group conversations between three or more users, and in public conversations generally open to the messaging community. The messaging component 540 may expose this functionality to the user using the user interface component 550.

The user interface component 550 of the messaging client 530 on a configuring client device 525 may receive an ephemeral control selection and transition the messaging client 530 on the configuring client device 525 to an ephemeral mode. This ephemeral control selection may be associated with a particular message thread and the transition to the ephemeral mode may be associated with this particular message thread, such that interactions within the message thread are subject to eventual deletion from the messaging system 110 based on message thread being in the ephemeral mode. The user interface component 550 may communicate an ephemeral mode setting 510 to the messaging component 540 so as to prompt the messaging component 540 to distribute the ephemeral mode setting 510 to other client devices.

The messaging component 540 of the messaging client 530 on the configuring client device 525 may transmit a messaging update 515 from the configuring client device 525 to the messaging system 110 via a network interface controller 523. The messaging update 515 may indicate the transition to the ephemeral mode for the message thread. The messaging update 515 may comprise an update object, the update object comprising one or more fields, wherein at least one of the fields indicates an ephemeral mode setting 510 configuring the message thread to the ephemeral mode.

The messaging system 110 may receive the messaging update 515 from the configuring client device 525. The messaging system 110 may determine a user account associated with the message thread, determine a recipient client device 520 as associated with the user account, and transmit the messaging update 515 to the recipient client device 520 based on the recipient client device 520 being associated with the user account, the messaging update 515 indicating the transition to the ephemeral mode for the message thread.

The messaging system 110 may determine a plurality of user accounts associated with a message thread, which may include the user account for the user of the configuring client device 525 and one or more user accounts for other users engaged with the message thread, with more than one other user account being associated with the message thread being the case for group threads. Each of the user accounts, including the sender's user account, may have one or more client devices associated with it, such as where a user uses multiple client devices (e.g., a desktop computer and/or a smartphone and/or a tablet device) to access their user account with the messaging system 110.

Some messaging clients may be legacy clients that don't support managing for themselves the extinction and removal of ephemeral messages. For these legacy clients the messaging system 110 may enforce ephemeral messaging removal by tracking the lifetime of an ephemeral message and then sending a messaging update for removal of the ephemeral message at the extinction of the ephemeral message's lifetime. As such, the messaging system 110 may determine a messaging client associated with the message thread, determine that the messaging client is a legacy client, and enforce ephemeral messaging on the third messaging client in response to determining that the messaging client is a legacy client.

The messaging component 540 of the messaging client 530 on the recipient client device 520 may receive the messaging update 515 via the network interface controller 523 of the recipient client device 520 from the messaging system 110. The messaging component 540 may determine a message thread associated with the messaging update 515 and determine that the messaging update 515 indicates a transition to an ephemeral mode for the message thread. The messaging component 540 may pass this ephemeral mode setting 510 to the user interface component 550 of the messaging client 530 on the recipient client device 520. The user interface component of the messaging client 530 on the recipient client device 520 may then configure a user interface for the message thread to an ephemeral mode interface based on the transition to the ephemeral mode for the message thread. As such, an ephemeral mode setting 510 may be communicated from a user interface component 550 for a messaging client 530 on a configuring client device 525 to the user interface component 550 for a messaging client 530 on a recipient client device 520 via a messaging system 110, such that the ephemeral mode setting 510 on one client device is empowered to configure that same ephemeral mode setting 510 on another client device.

Configuring the user interface for the message thread to the ephemeral mode interface may comprise changing the visual representation of the message thread. Configuring the user interface for the message thread to the ephemeral mode interface may comprise changing a user interface color scheme to an ephemeral mode color scheme. An ephemeral mode color scheme may be a predefined adjustment of a custom color scheme for the message thread, such as a defined lightning, darkening, or color adjustment of a custom color scheme.

In some embodiments, the messaging system 110 may support ephemeral mode delays of different lengths. In some cases, a predefined set of ephemeral mode delays may be defined and only those ephemeral mode delays made available to users of the messaging system 110. In other cases, an ephemeral mode delay may be defined without the user having to choose from a specific list of available ephemeral mode delays. An ephemeral mode setting 510 may specify a selection by a user of the configuring client device 525 of the ephemeral mode delay to be used for a particular instance of the ephemeral mode being activated for a message thread. As such, the messaging update 515 may indicate an ephemeral mode delay for the message thread, the ephemeral mode delay configuring a message removal period for ephemeral messages in the message thread. This configured ephemeral mode delay may be displayed in the user interface for the message thread to the user of the recipient client device 520.

Figure 6:
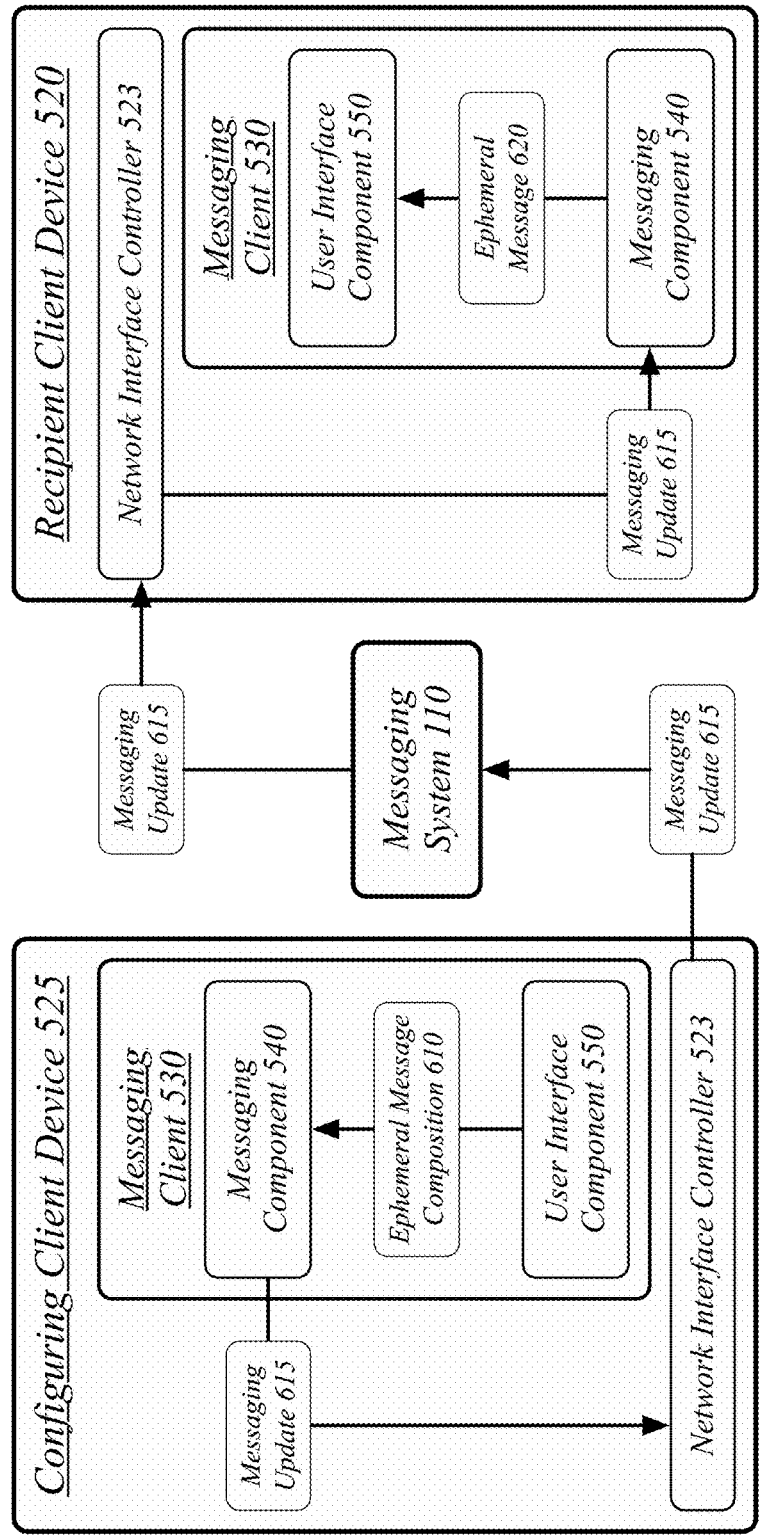
FIG. 6 illustrates an embodiment of a display configuration system transmitting a messaging update comprising an ephemeral message from a configuring client device to a recipient client device.

FIG. 6 illustrates an embodiment of a display configuration system 100 transmitting a messaging update 615 comprising an ephemeral message from a configuring client device 525 to a recipient client device 520.

Once the message thread is in the ephemeral mode, a message composition received via the user interface component 550 comprises an ephemeral message composition 610. The messaging component of the messaging client 530 may receive an ephemeral message composition 610 and transmit it to the recipient client device 520 via the messaging system 110 as a messaging update 615. The identification of recipient user accounts and the recipient client device 520 may be performed as with other messaging updates, as discussed with reference to FIG. 5.

The messaging component 540 of the messaging client 530 on the recipient client device 520 may receive an incoming user message from the messaging system 110, determine the message thread as being associated with the incoming user message, and display the incoming user message in the user interface for the message thread as an ephemeral message 620. The user interface component 550 may display an ephemeral timer in association with the incoming user message in the user interface for the message thread. The user interface component 550 may remove the incoming user message from the user interface for the message thread at an extinction of the ephemeral timer.

The user interface component 550 may display a user message in the user interface for a message thread. The user interface component 550 may display an ephemeral timer in association with the user message in the user interface for the message thread. The ephemeral timer may comprise a progress bar display. The user interface component 550 may remove the user message from the user interface for the message thread at an extinction of the ephemeral timer. The user interface component 550 may replace the user message with a removed message indicator after removing the user message from the user interface for the message thread at the extinction of the ephemeral timer.

A message thread may be transitioned to a non-ephemeral mode even while ephemeral messages are still available in the message thread. The user interface component 550 may configure the user interface for the message thread to a non-ephemeral mode interface based on the transition to the non-ephemeral mode for the message thread. The user interface component 550 may continue display of the ephemeral timer in association with the user message in the user interface for the message thread after the configuring of the user interface for the message thread to the non-ephemeral mode interface.

Communication other than textual messages may be exchanged in the ephemeral mode. For instance, media may be exchanged in the ephemeral mode, with the media removed from the messaging clients of the client devices and the messaging system 110 after extinction of an ephemeral message timer. The removal of messages from a message thread entered in the ephemeral mode may extend to messages communicating other activities engaged via the message thread, such as voice calls, video calls, functions of external applications, interactions with third parties temporarily included in the message thread, or any other activities carried out in a message thread. For instance, the messaging component 540 may engage in a media call via the message thread between the recipient client device 520 and another client device, such as the configuring client device 525. The user interface component 550 may display a media call record in the user interface for the message thread. This media call record may comprise a message subject to the same removal as any other message received while in the ephemeral mode. The user interface component 550 may remove the media call record from the user interface for the message thread at an extinction of an ephemeral timer associated with the media call record, which ephemeral timer may begin at the conclusion of the media call. A media call may correspond to a voice call, video call, or any other form of call.

Some functions may be disabled while in the ephemeral mode so as to serve the privacy purposes of the ephemeral mode. For instance, the user interface component 550 may disable a media forwarding interface for a media item received in the ephemeral mode. This may serve to protect the privacy of media exchanged in the ephemeral mode. However, this may not prevent, for example, screen captures being taken of media displayed in the ephemeral mode. As such, the user interface component 550 may monitor whether screen capture is engaged on a recipient client device 520 by a user of the recipient client device 520. If screen capture is engaged on the recipient client device 520, the user interface component 550 may detect the engagement of screen capture on the recipient client device 520 and report the engagement of screen capture to all user account associated with the message thread via the messaging component 540. This may empower users interacting with the message thread to use social pressure to enforce the privacy of the ephemeral mode where a client device overrides the protections on media sharing enforced by the messaging client 530. Similarly, the user interface component 550 may disable a money sending interface where the message thread is in the ephemeral mode.

Ephemeral mode may be disabled for some message threads. For instance, message threads with business entities may not be allowed to use the ephemeral mode in order to prevent businesses from engaging in interactions with users that the user is thereafter prevented from showing a recording of. As such, a user interface component 550 may receive a business thread selection in a messaging client 530 on a client device, display a business thread in response to the business thread selection, the business thread associated with a business entity, and disable an ephemeral control for the business thread based on the business thread being associated with the business entity.

In some embodiments, the contents of ephemeral communication may be excluded from thread previews that may be displayed in the inbox view in which a message thread may be selected. This may serve to protect the privacy of the ephemeral communication. In response to a most-recent message for the message thread being an ephemeral message, the user interface component 550 may display an ephemeral form message as a thread preview in a message thread selection interface on the recipient client device 520 instead of showing a preview of the ephemeral message.

In some embodiments, the messaging system 110 may distribute notifications when new messages are received. In some of these embodiments, notifications received on a client device may be displayed on a lock screen or home screen of the client device. A preview of the received message may be disclosed on this screen. However, for ephemeral messages, instead an ephemeral form message may be displayed in order to preserve the privacy of the ephemeral communication. In some embodiments, a notification may be displayed in association with a progress bar on the lock screen or home screen so as to communicate the lifetime of the ephemeral message. When an ephemeral message expires, the ephemeral form message may be replaced by a removed ephemeral form message indicating that the ephemeral message has expired.

Figure 7:
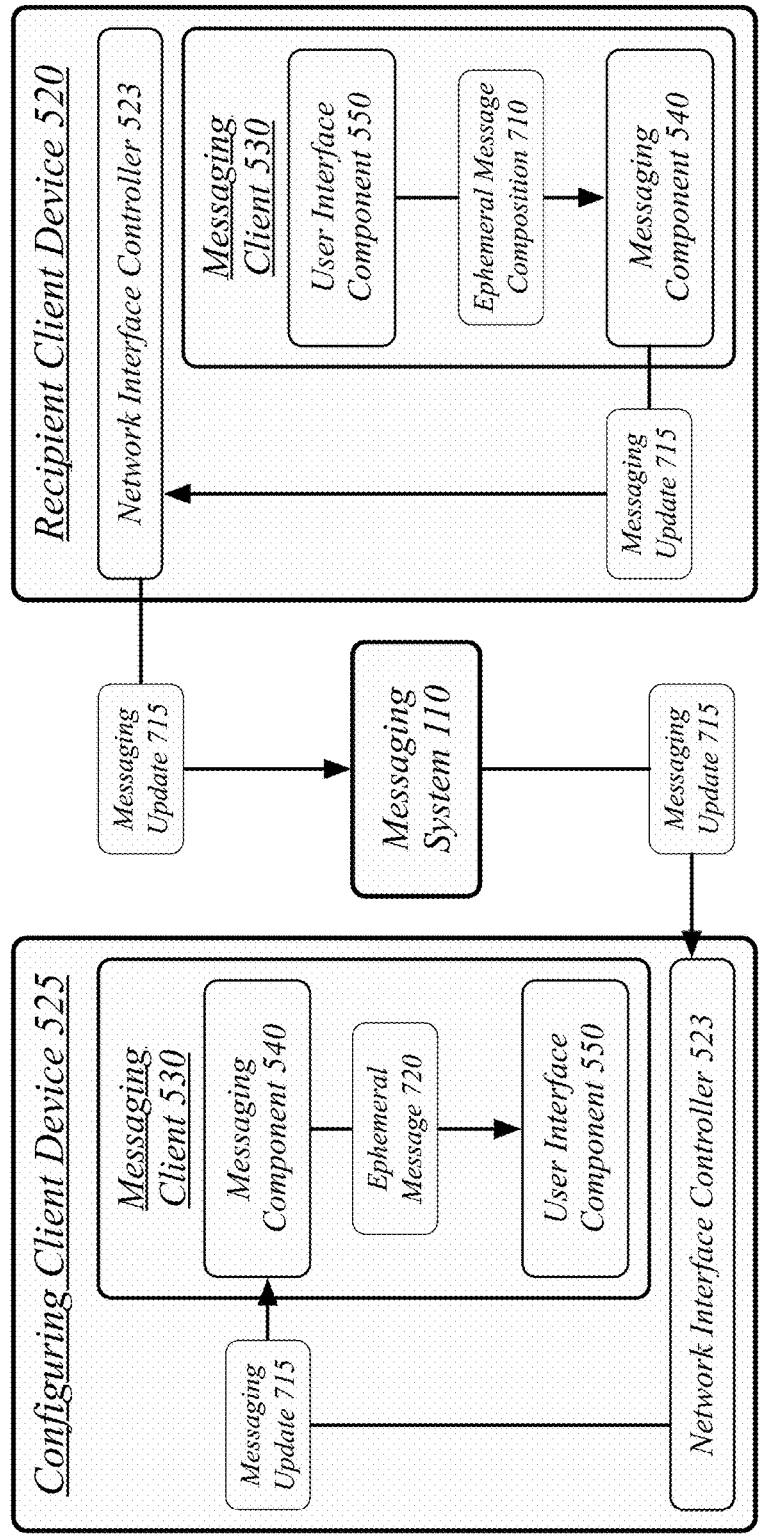
FIG. 7 illustrates an embodiment of a display configuration system transmitting a messaging update comprising an ephemeral message from a recipient client device to a configuring client device.

FIG. 7 illustrates an embodiment of a display configuration system 100 transmitting a messaging update 715 comprising an ephemeral message from a recipient client device 520 to a configuring client device 525.

The recipient client device 520, which was configured to the ephemeral mode by a configuring client device 525 via the messaging system 110, may also compose and transmit ephemeral messages based on a message thread being in the ephemeral mode. The user interface component 550 of the messaging client 530 on the recipient client device 520 may receive a messaging composition interaction via the user interface for the message thread, the messaging composition interaction comprising a user message. The user interface component 550 may mark the user message as an ephemeral user message based on the messaging thread being in the ephemeral mode, thereby producing an ephemeral message composition 710. The ephemeral message composition 710 may be passed to the messaging composition 540. The messaging component 540 may transmit the user message to the messaging system 110 for delivery to the configuring client device 525 and possibly one or more other client devices. As such, the transmission of the recipient client device 520 of a messaging update 715 marked as an ephemeral message may be based on the remote configuration of the messaging client 530 on the recipient client device 520 by a configuring client device 525.

Figure 8:
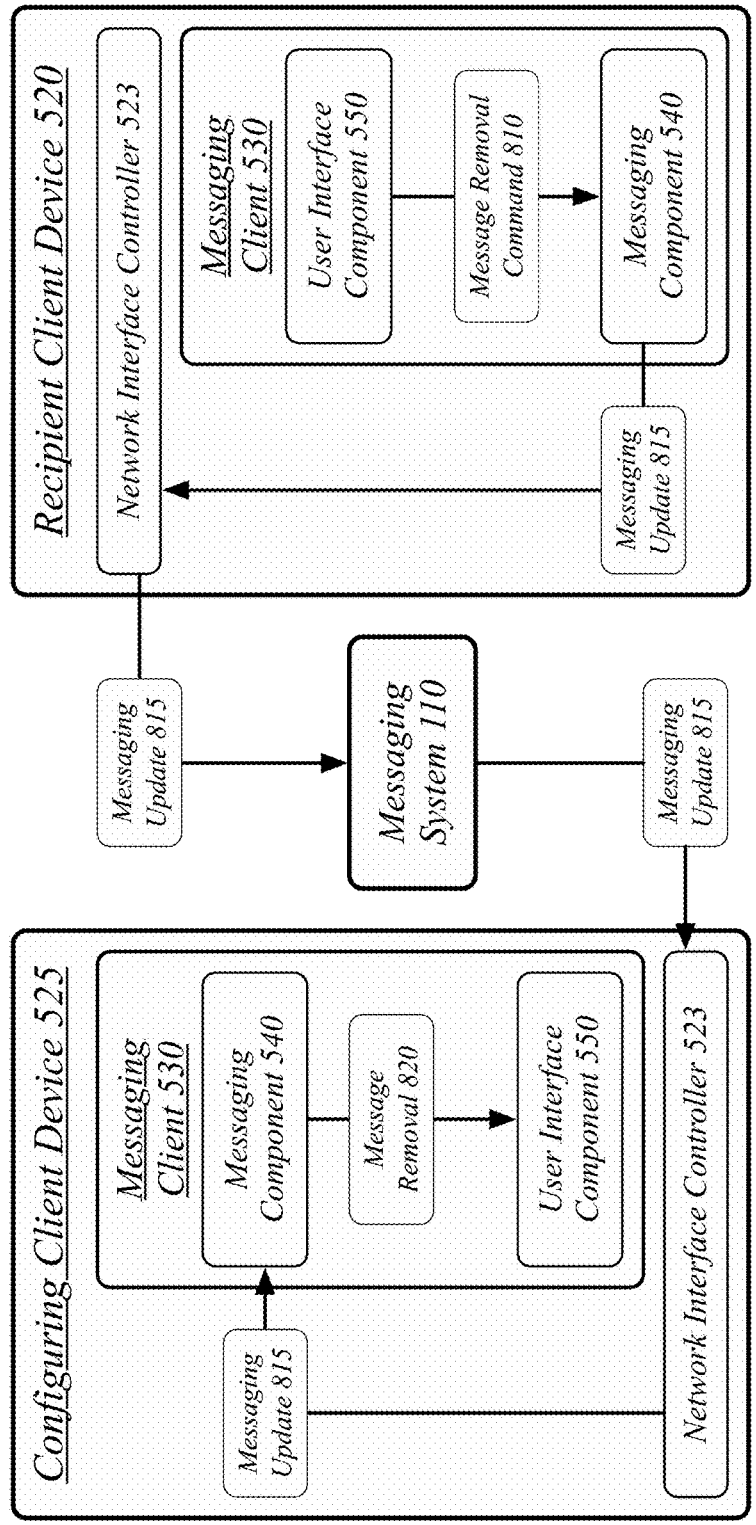
FIG. 8 illustrates an embodiment of a display configuration system transmitting a messaging update comprising a message removal from a recipient client device to a configuring client device.

FIG. 8 illustrates an embodiment of a display configuration system 100 transmitting a messaging update comprising a message removal from a recipient client device 520 to a configuring client device 525.

In some cases, ephemeral messages may be prematurely removed—removed prior to the extinction of their ephemeral message timers—based on instruction by a user engaged with a message thread. This may be used, for example, by a user receiving an ephemeral message after they have viewed the ephemeral message and are willing to lose their ability to view the ephemeral message prior to its normal time of extinction. Alternatively, this may be used by a user sending an ephemeral message if they're interested in removing other user's ability to view an ephemeral message prior to the normal time of extinction for the ephemeral message.

The user interface component 550 may receive a message removal command at a messaging client 530 via the user interface for the message thread and remove the user message from the user interface for the message thread in response to the message removal command received via the user interface. The user interface component 550 may pass the message removal command 810 to the messaging component 540. A message removed from display by the user interface component 550 may also be removed from storage by the messaging component 540. The messaging component 540 may then transmit a message removal update via the messaging system 110 to other client devices as a messaging update 815. Where the message removal command 810 is initiated on the recipient client device 520 this may thereby serve to initiate a message removal 820 on the configuring client device 525.

In some embodiments, a message removal command 810 may be communicated via gesture controls. For instance, shaking a client device may be used to indicate that the ephemeral messages for a message thread should be prematurely removed. The user interface component 550 may receive gesture control input at the messaging client 530, the gesture control input corresponding to a shaking motion, the gesture control input comprising the message removal command 810. The user interface component 550 may remove the user message from the user interface for the message thread in response to the gesture control input. The messaging component 540 may transmit the message removal update via the messaging system in response to the gesture control input.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
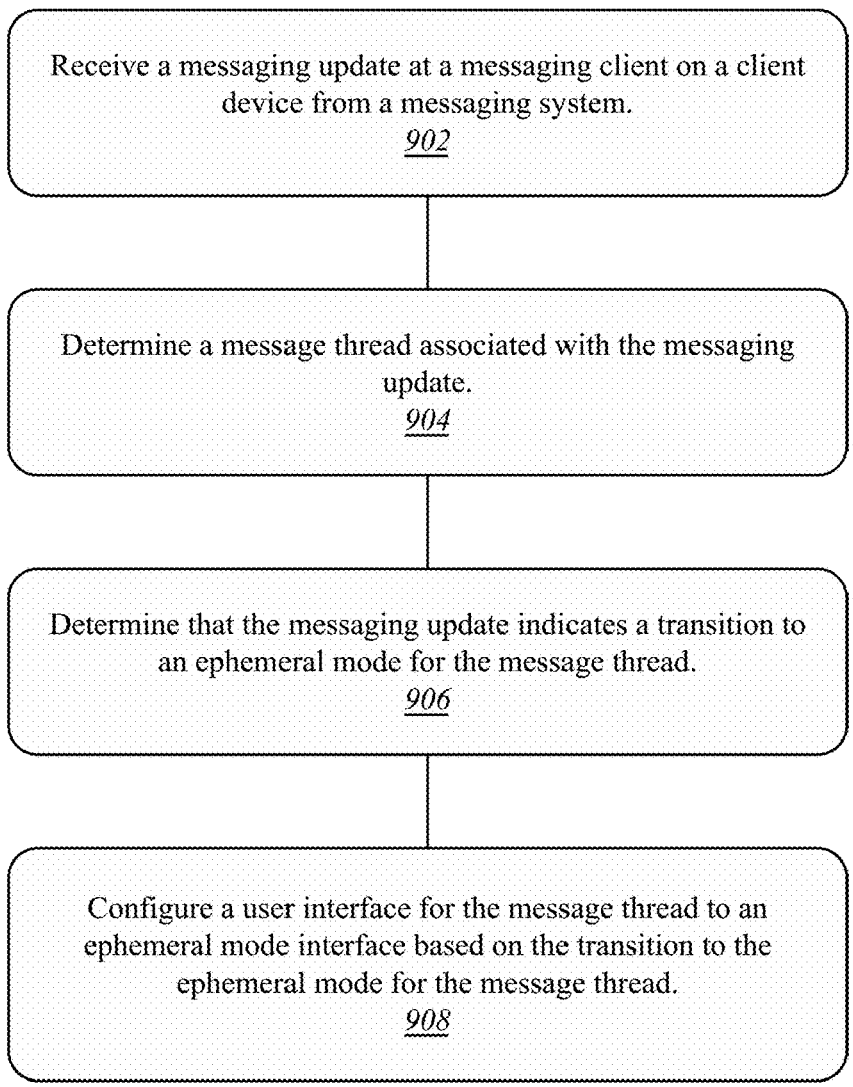
FIG. 9 illustrates an embodiment of a logic flow for the system of FIG. 1.

FIG. 9 illustrates one embodiment of a logic flow 900. The logic flow 900 may be representative of some or all of the operations executed by one or more embodiments described herein.

In the illustrated embodiment shown in FIG. 9, the logic flow 900 may receive a messaging update at a messaging client on a client device from a messaging system at block 902.

The logic flow 900 may determine a message thread associated with the messaging update at block 904.

The logic flow 900 may determine that the messaging update indicates a transition to an ephemeral mode for the message thread at block 906.

The logic flow 900 may configure a user interface for the message thread to an ephemeral mode interface based on the transition to the ephemeral mode for the message thread at block 908.

The embodiments are not limited to this example.

Figure 10:
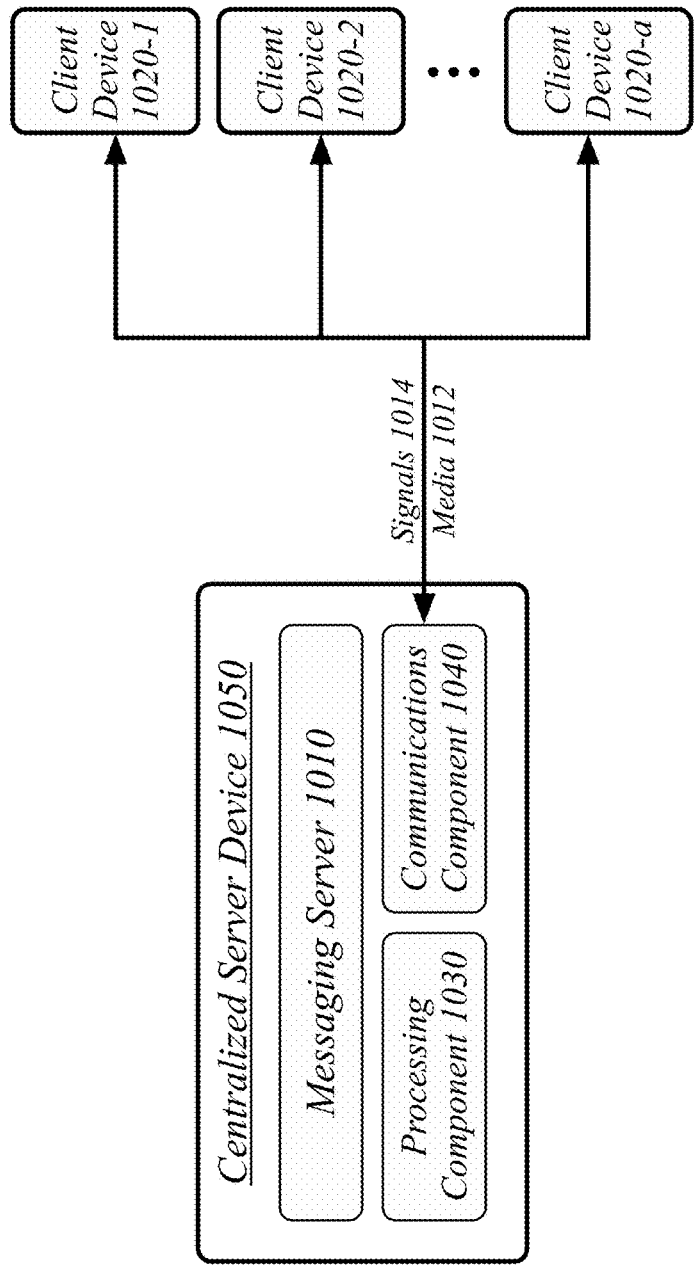
FIG. 10 illustrates an embodiment of a centralized system for the system of FIG. 1.

FIG. 10 illustrates a block diagram of a centralized system 1000. The centralized system 1000 may implement some or all of the structure and/or operations for the display configuration system 100 in a single computing entity, such as entirely within a single centralized server device 1050.

The centralized server device 1050 may comprise any electronic device capable of receiving, processing, and sending information for the display configuration system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1050 may execute processing operations or logic for the display configuration system 100 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1050 may execute communications operations or logic for the display configuration system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The centralized server device 1050 may communicate with other devices over a communications media 1012 using communications signals 1014 via the communications component 1040.

The centralized server device 1050 may execute a messaging server 1010. A messaging server 1010 may comprise an element of a messaging system 110 operative to exchange messaging updates on behalf of client devices 1020. The messaging server 1010 may receive messaging updates, determine recipient client devices for the messaging updates, and forward the messaging updates to the recipient client devices. The client devices 1020 may correspond to any of the smartphone device 150, tablet device 160, personal computer device 180, client device 220, recipient client device 520, configuring client device 525, or any other client device for a messaging system 110.

Figure 11:
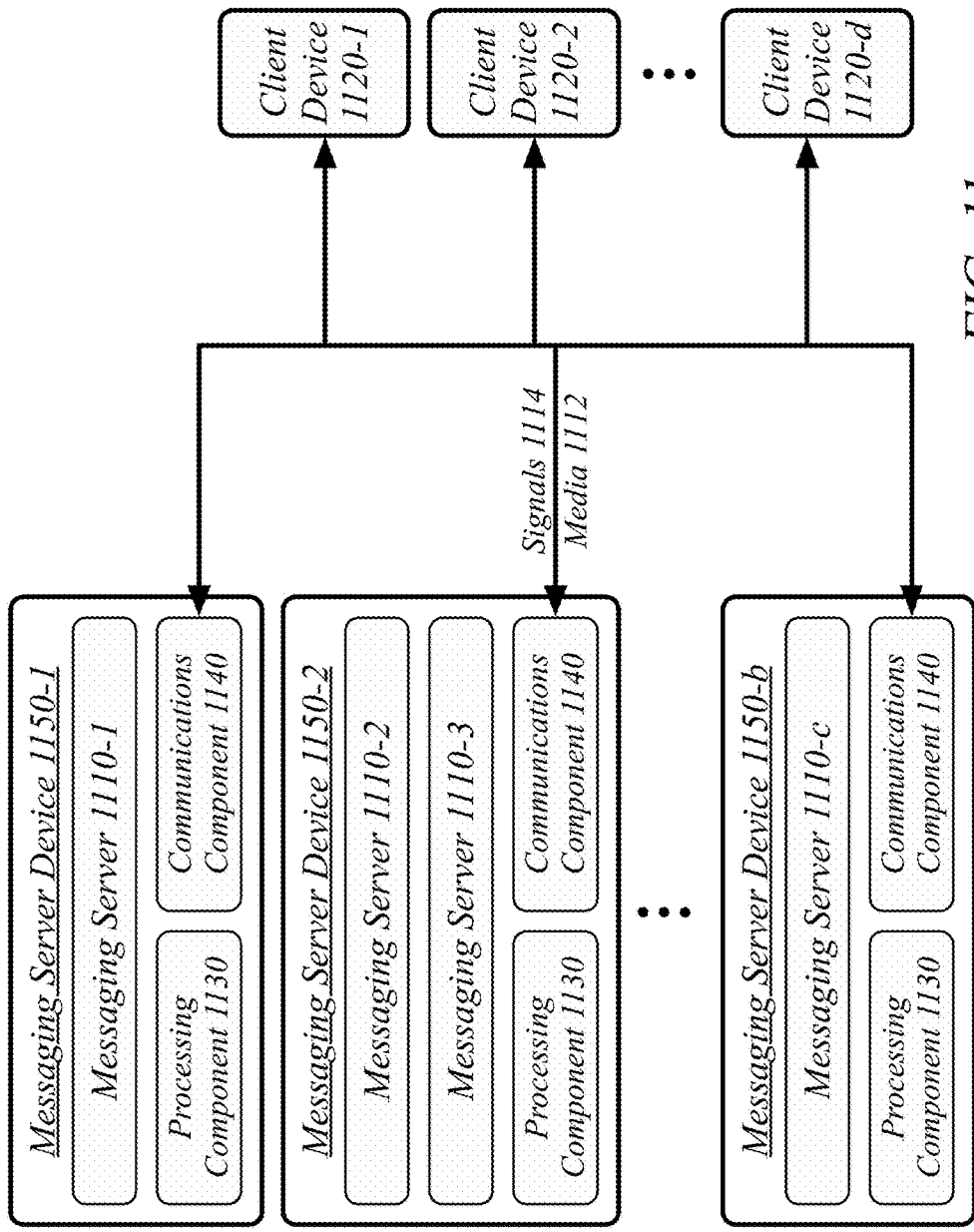
FIG. 11 illustrates an embodiment of a distributed system for the system of FIG. 1.

FIG. 11 illustrates a block diagram of a distributed system 1100. The distributed system 1100 may distribute portions of the structure and/or operations for the display configuration system 100 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a plurality of messaging server devices 1150. In general, the server devices 1150 may be the same or similar to the centralized server device 1050 as described with reference to FIG. 10.

For instance, the server devices 1150 may each comprise a processing component 1130 and a communications component 1140 which are the same or similar to the processing component 1030 and the communications component 1040, respectively, as described with reference to FIG. 10. In another example, the server devices 1150 may communicate over a communications media 1112 using communications signals 1114 via the communications components 1140.

The messaging server devices 1150 may each execute a messaging server 1110 or one or more messaging servers. A messaging server 1110 may comprise an element of a messaging system 110 operative to exchange messaging updates on behalf of client devices 1120. The messaging servers 1110 may receive messaging updates, determine recipient client devices for the messaging updates, and forward the messaging updates to the recipient client devices. The client devices 1120 may correspond to any of the smartphone device 150, tablet device 160, personal computer device 180, client device 220, recipient client device 520, configuring client device 525, client devices 1020, or any other client device for a messaging system 110.

Figure 12:
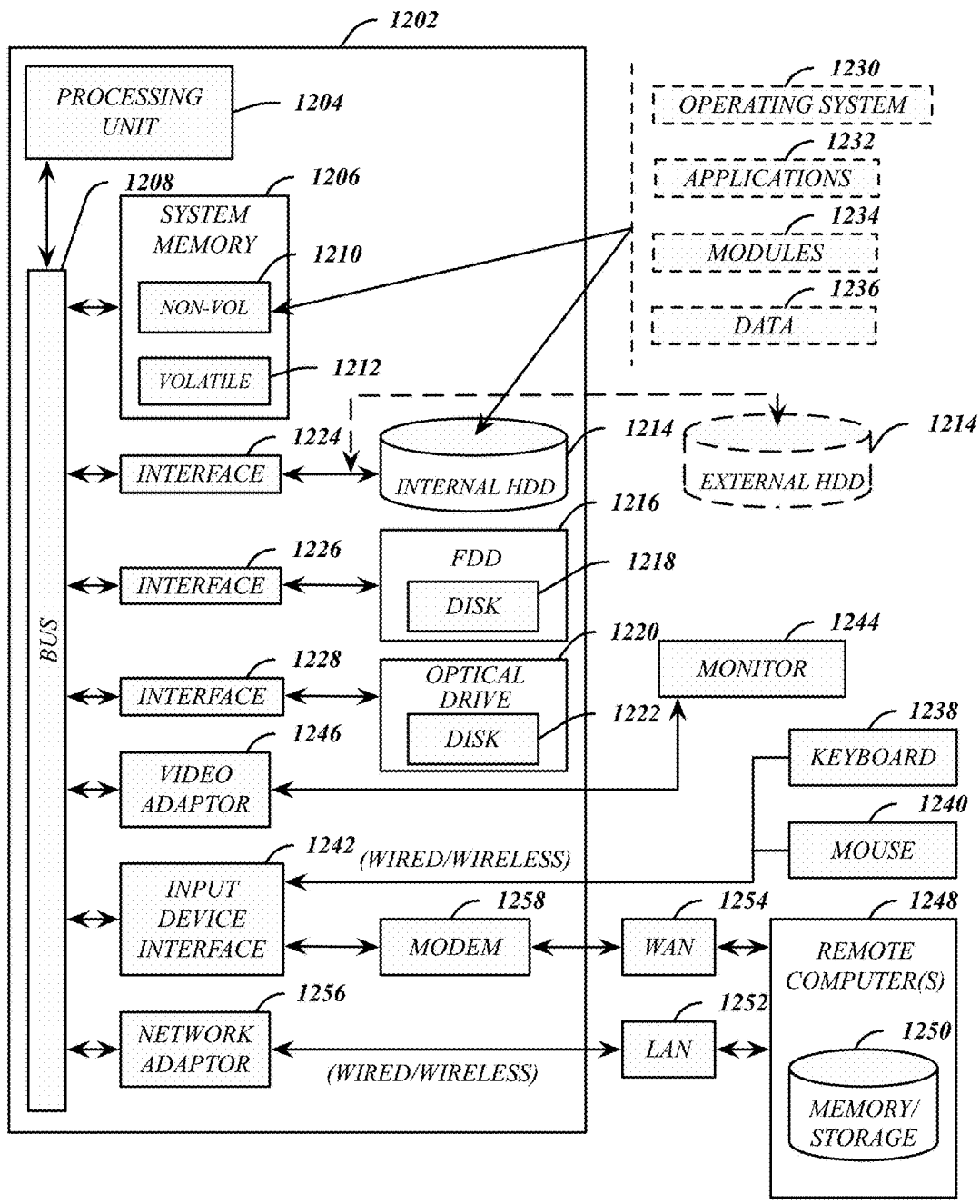
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 10, 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the display configuration system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.12 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.12x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
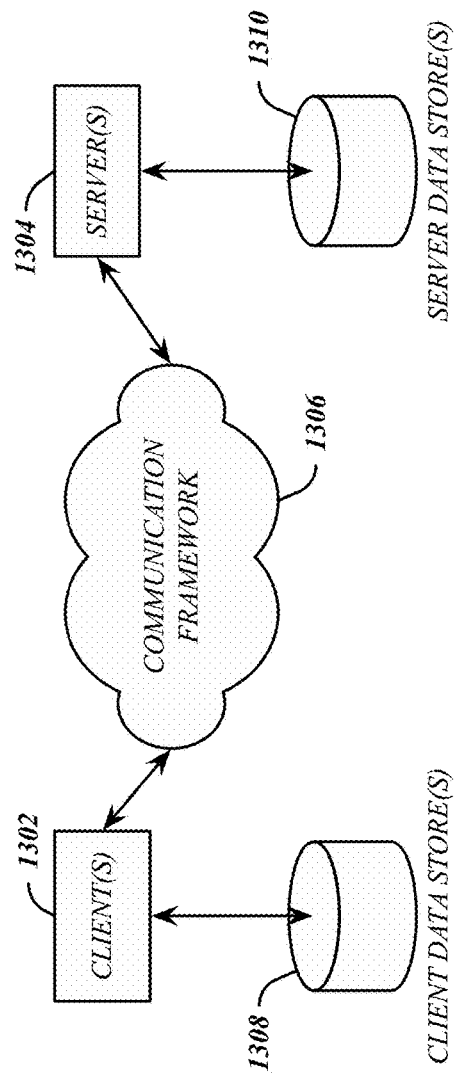
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement any of the smartphone device 150, tablet device 160, personal computer device 180, client device 220, recipient client device 520, configuring client device 525, client devices 1020, client devices 1120, or any other client device for a messaging system 110. The servers 1304 may implement the centralized server device 1050, messaging server devices 1150, or any other server devices for a messaging system 110. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
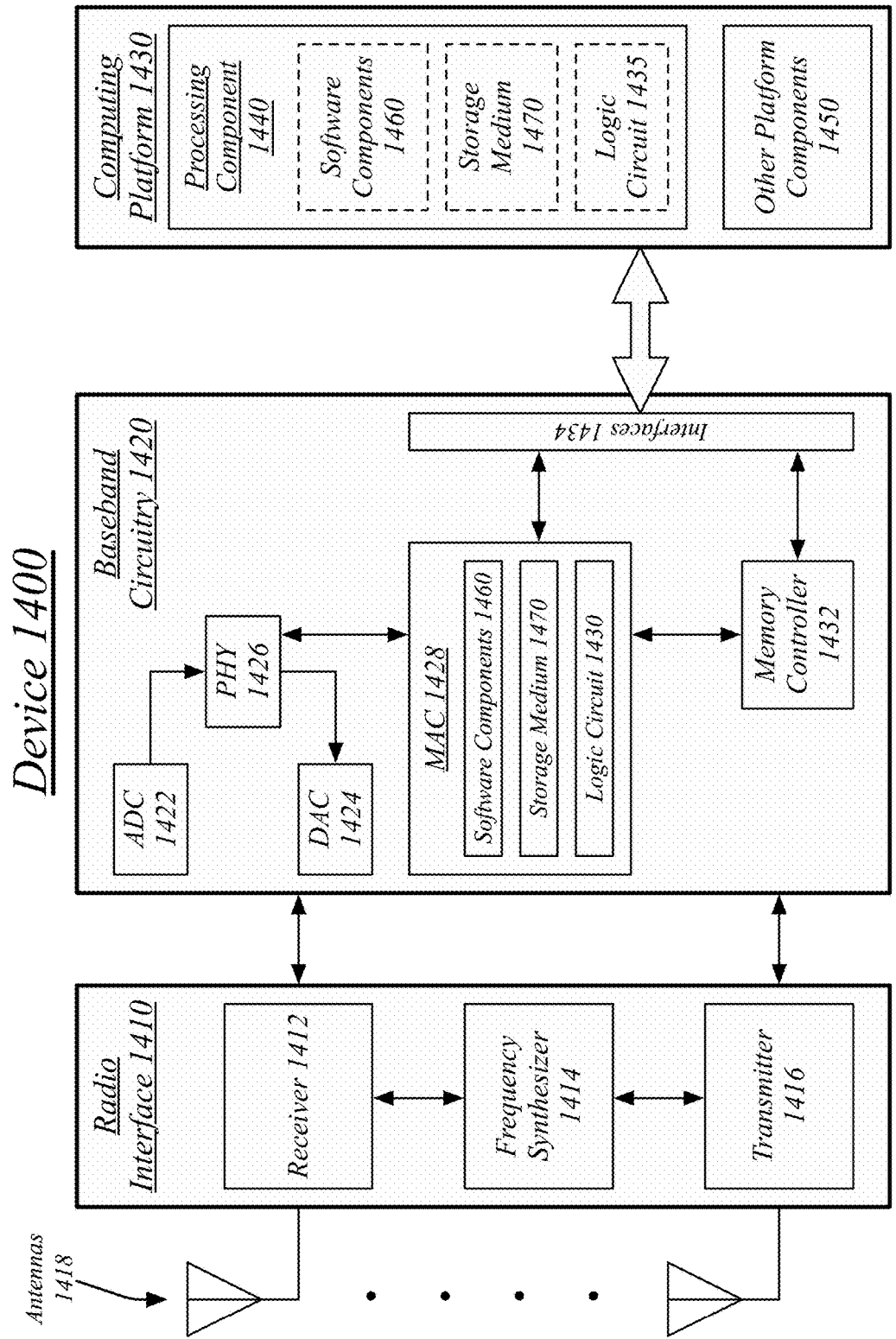
FIG. 14 illustrates an embodiment of a radio device architecture.

FIG. 14 illustrates an embodiment of a device 1400 for use in a multicarrier OFDM system, such as the display configuration system 100. Device 1400 may implement, for example, software components 1460 as described with reference to display configuration system 100 and/or a logic circuit 1435. The logic circuit 1435 may include physical circuits to perform operations described for the display configuration system 100. As shown in FIG. 14, device 1400 may include a radio interface 1410, baseband circuitry 1420, and computing platform 1430, although embodiments are not limited to this configuration.

The device 1400 may implement some or all of the structure and/or operations for the display configuration system 100 and/or logic circuit 1435 in a single computing entity, such as entirely within a single device. Alternatively, the device 1400 may distribute portions of the structure and/or operations for the display configuration system 100 and/or logic circuit 1435 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1456 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with processing circuit 1428 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames, such as radio frames. Alternatively or in addition, MAC processing circuit 1428 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for the display configuration system 100 and logic circuit 1435 using the processing component 1440. The processing component 1440 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a messaging update at a messaging client on a client device from a messaging system; determining a message thread associated with the messaging update; determining that the messaging update indicates a transition to an ephemeral mode for the message thread; and configuring a user interface for the message thread to an ephemeral mode interface based on the transition to the ephemeral mode for the message thread.

A computer-implemented method may further comprise disabling a money sending interface where the message thread is in the ephemeral mode.

A computer-implemented method may further comprise disabling a media forwarding interface for a media item received in the ephemeral mode.

A computer-implemented method may further comprise engaging in a media call via the message thread; displaying a media call record in the user interface for the message thread; and removing the media call record from the user interface for the message thread at an extinction of an ephemeral timer.

A computer-implemented method may further comprise the messaging update indicating an ephemeral mode delay for the message thread, the ephemeral mode delay configuring a message removal period for ephemeral messages in the message thread.

A computer-implemented method may further comprise displaying an ephemeral form message as a thread preview in a message thread selection interface on the client device in response to a most-recent message for the message thread being an ephemeral message.

A computer-implemented method may further comprise receiving a ephemeral control selection in a second messaging client on a second client device; transitioning the second messaging client to the ephemeral mode; transmitting the messaging update from the second client device to the messaging system, the messaging update indicating the transition to the ephemeral mode for the message thread.

A computer-implemented method may further comprise receiving a business thread selection in the second messaging client on the second client device; displaying a business thread in response to the business thread selection, the business thread associated with a business entity; and disabling an ephemeral control for the business thread based on the business thread being associated with the business entity.

A computer-implemented method may further comprise receiving the messaging update from the second client device; determining a user account associated with the message thread; determining the client device as associated with the user account; and transmitting the messaging update to the client device based on the client device being associated with the user account, the messaging update indicating the transition to the ephemeral mode for the message thread.

A computer-implemented method may further comprise determining a third messaging client associated with the message thread; determining that the third messaging client is a legacy client; and enforcing ephemeral messaging on the third messaging client in response to determining that the third messaging client is a legacy client.

A computer-implemented method may further comprise receiving a messaging composition interaction via the user interface for the message thread, the messaging composition interaction comprising a user message; marking the user message as an ephemeral user message based on the messaging thread being in the ephemeral mode; and transmitting the user message to the messaging system.

A computer-implemented method may further comprise receiving an incoming user message at the messaging client on the client device from the messaging system; determining the message thread as being associated with the incoming user message; displaying the incoming user message in the user interface for the message thread; displaying an ephemeral timer in association with the incoming user message in the user interface for the message thread; and removing the incoming user message from the user interface for the message thread at an extinction of the ephemeral timer.

A computer-implemented method may further comprise displaying the user message in the user interface for the message thread; displaying an ephemeral timer in association with the user message in the user interface for the message thread; and removing the user message from the user interface for the message thread at an extinction of the ephemeral timer.

A computer-implemented method may further comprise replacing the user message with a removed message indicator after removing the user message from the user interface for the message thread at the extinction of the ephemeral timer.

A computer-implemented method may further comprise the ephemeral timer comprising a progress bar display.

A computer-implemented method may further comprise transitioning the message thread to a non-ephemeral mode; configuring the user interface for the message thread to a non-ephemeral mode interface based on the transition to the non-ephemeral mode for the message thread; and continuing display of the ephemeral timer in association with the user message in the user interface for the message thread after the configuring of the user interface for the message thread to the non-ephemeral mode interface.

A computer-implemented method may further comprise wherein configuring the user interface for the message thread to the ephemeral mode interface comprises changing a user interface color scheme to an ephemeral mode color scheme.

A computer-implemented method may further comprise wherein the ephemeral mode color scheme is a predefined adjustment of a custom color scheme for the message thread.

A computer-implemented method may further comprise receiving a message removal command at the messaging client via the user interface for the message thread; removing the user message from the user interface for the message thread in response to the message removal command received via the user interface; and transmitting a message removal update via the messaging system.

A computer-implemented method may further comprise receiving gesture control input at the messaging client, the gesture control input corresponding to a shaking motion, the gesture control input comprising the message removal command; removing the user message from the user interface for the message thread in response to the gesture control input; and transmitting the message removal update via the messaging system in response to the gesture control input.

An apparatus may comprise a processor circuit on a client device; a network interface controller on the client device; a messaging component operative on the processor circuit to receive a messaging update at a messaging client on the client device via the network interface controller from a messaging system; determine a message thread associated with the messaging update; and determine that the messaging update indicates a transition to an ephemeral mode for the message thread; and a user interface component operative on the processor circuit to configure a user interface for the message thread to an ephemeral mode interface based on the transition to the ephemeral mode for the message thread. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a messaging update at a messaging client on a client device from a second client device via a messaging system;
determining a message thread associated with the messaging update;
determining that the messaging update comprises an ephemeral mode setting configuring a transition to an ephemeral mode for the message thread on the client device, wherein the ephemeral mode setting selected on the second client device for the message thread configures the ephemeral mode on the client device;
configuring a user interface for the message thread to an ephemeral mode interface based on the transition to the ephemeral mode for the message thread;
receiving a messaging composition interaction via the user interface for the message thread, the messaging composition interaction comprising a user message;
marking the user message as an ephemeral user message based on the messaging thread being configured to the ephemeral mode by the second client device; and
transmitting the user message to the messaging system.

2. The method of claim 1, the messaging update indicating an ephemeral mode delay for the message thread, the ephemeral mode delay configuring a message removal period for ephemeral messages in the message thread.

3. The method of claim 1, further comprising:
receiving a ephemeral control selection in a second messaging client on the second client device;
transitioning the second messaging client to the ephemeral mode;
transmitting the messaging update from the second client device to the messaging system, the messaging update indicating the transition to the ephemeral mode for the message thread.

4. The method of claim 3, further comprising:
receiving the messaging update from the second client device;
determining a user account associated with the message thread;
determining the client device as associated with the user account; and
transmitting the messaging update to the client device based on the client device being associated with the user account, the messaging update indicating the transition to the ephemeral mode for the message thread.

5. The method of claim 1, further comprising:
displaying the user message in the user interface for the message thread;
displaying an ephemeral timer in association with the user message in the user interface for the message thread; and
removing the user message from the user interface for the message thread at an extinction of the ephemeral timer.

6. The method of claim 5, further comprising:
transitioning the message thread to a non-ephemeral mode;
configuring the user interface for the message thread to a non-ephemeral mode interface based on the transition to the non-ephemeral mode for the message thread; and
continuing display of the ephemeral timer in association with the user message in the user interface for the message thread after the configuring of the user interface for the message thread to the non-ephemeral mode interface.

7. The method of claim 1, wherein configuring the user interface for the message thread to the ephemeral mode interface comprises changing a user interface color scheme to an ephemeral mode color scheme.

8. The method of claim 1, further comprising:
receiving a message removal command at the messaging client via the user interface for the message thread;
removing the user message from the user interface for the message thread in response to the message removal command received via the user interface; and
transmitting a message removal update via the messaging system.

9. An apparatus, comprising:
a processor circuit on a client device;
a network interface controller on the client device;
a messaging component operative on the processor circuit to receive a messaging update at a messaging client on the client device via the network interface controller from a second client device via a messaging system; determine a message thread associated with the messaging update; determine that the messaging update comprises an ephemeral mode setting configuring a transition to an ephemeral mode for the message thread on the client device, wherein the ephemeral mode setting selected on the second client device for the message thread configures the ephemeral mode on the client device; and transmit a user message to the messaging system; and
a user interface component operative on the processor circuit to configure a user interface for the message thread to an ephemeral mode interface based on the transition to the ephemeral mode for the message thread; receive a messaging composition interaction via the user interface for the message thread, the messaging composition interaction comprising the user message; and mark the user message as an ephemeral user message based on the messaging thread being configured to the ephemeral mode by the second client device.

10. The apparatus of claim 9, the messaging update indicating an ephemeral mode delay for the message thread, the ephemeral mode delay configuring a message removal period for ephemeral messages in the message thread.

11. The apparatus of claim 9, further comprising:
the user interface component operative to display the user message in the user interface for the message thread; display an ephemeral timer in association with the user message in the user interface for the message thread; and remove the user message from the user interface for the message thread at an extinction of the ephemeral timer.

12. The apparatus of claim 11, further comprising:
the user interface component operative to transition the message thread to a non-ephemeral mode; configure the user interface for the message thread to a non-ephemeral mode interface based on the transition to the non-ephemeral mode for the message thread; and continue display of the ephemeral timer in association with the user message in the user interface for the message thread after the configuring of the user interface for the message thread to the non-ephemeral mode interface.

13. The apparatus of claim 9, wherein configuring the user interface for the message thread to the ephemeral mode interface comprises changing a user interface color scheme to an ephemeral mode color scheme.

14. At least one computer-readable storage medium comprising instructions that, when executed, cause a system to:
receive a messaging update at a messaging client on a client device from a second client device via a messaging system;
determine a message thread associated with the messaging update;
determine that the messaging update comprises an ephemeral mode setting configuring a transition to an ephemeral mode for the message thread on the client device, wherein the ephemeral mode setting selected on the second client device for the message thread configures the ephemeral mode on the client device;
configure a user interface for the message thread to an ephemeral mode interface based on the transition to the ephemeral mode for the message thread;
receive a messaging composition interaction via the user interface for the message thread, the messaging composition interaction comprising a user message;
mark the user message as an ephemeral user message based on the messaging thread being configured to the ephemeral mode by the second client device; and
transmit the user message to the messaging system.

15. The computer-readable storage medium of claim 14, the messaging update indicating an ephemeral mode delay for the message thread, the ephemeral mode delay configuring a message removal period for ephemeral messages in the message thread.

16. The computer-readable storage medium of claim 14, comprising further instructions that, when executed, cause a system to:
display the user message in the user interface for the message thread;
display an ephemeral timer in association with the user message in the user interface for the message thread; and
remove the user message from the user interface for the message thread at an extinction of the ephemeral timer.

17. The computer-readable storage medium of claim 16, comprising further instructions that, when executed, cause a system to:
transition the message thread to a non-ephemeral mode;
configure the user interface for the message thread to a non-ephemeral mode interface based on the transition to the non-ephemeral mode for the message thread; and
continue display of the ephemeral timer in association with the user message in the user interface for the message thread after the configuring of the user interface for the message thread to the non-ephemeral mode interface.

18. The computer-readable storage medium of claim 14, wherein configuring the user interface for the message thread to the ephemeral mode interface comprises changing a user interface color scheme to an ephemeral mode color scheme.

* * * * *